United States Patent
Nakamura et al.

(10) Patent No.: US 7,249,324 B2
(45) Date of Patent: Jul. 24, 2007

(54) ELECTRONIC PAPER FILE

(75) Inventors: Tetsuroh Nakamura, Takaraduka (JP); Hiroyuki Matsuo, Neyagawa (JP); Masaichiro Tatekawa, Minoo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 779 days.

(21) Appl. No.: 10/451,735

(22) PCT Filed: Dec. 28, 2001

(86) PCT No.: PCT/JP01/11674

§ 371 (c)(1),
(2), (4) Date: Jun. 25, 2003

(87) PCT Pub. No.: WO02/054376

PCT Pub. Date: Jul. 11, 2002

(65) Prior Publication Data

US 2004/0044682 A1 Mar. 4, 2004

(30) Foreign Application Priority Data

Dec. 28, 2000 (JP) .......................... 2000-401684
May 2, 2001 (JP) .......................... 2001-134810

(51) Int. Cl.
*G06F 3/048* (2006.01)
*G09G 5/00* (2006.01)

(52) U.S. Cl. .................... 715/776; 715/751; 715/761; 715/748; 715/741; 345/1.1; 345/1.3; 345/1.2

(58) Field of Classification Search ............... 715/776, 715/777, 751, 733, 748, 741, 743, 755, 758, 715/759, 761, 512, 526, 511; 345/1.1, 1.2, 345/1.3
See application file for complete search history.

(56) References Cited

U.S. PATENT DOCUMENTS 5,237,651 A * 8/1993 Randall ...................... 715/776
5,283,864 A * 2/1994 Knowlton .................... 715/776

(Continued)

FOREIGN PATENT DOCUMENTS

JP 1-96050 6/1989

(Continued)

OTHER PUBLICATIONS

Japan Hardcopy '99, K. Sano et al. "Decolorable Ink (imaging material)", Toshiba Corporation Research and Development Center I. Komukai Toshiba-cho, Saiwai-ku, Kawasaki 210-8582 Japan, pp. 209-251 (Cited in p. 1 of Specification).

Primary Examiner—Raymond J. Bayerl
(74) Attorney, Agent, or Firm—McDermott Will & Emery LLP

(57) ABSTRACT

An electronic paper file with an advantage like a book or a notebook can settle a conventional problem regarding the displaying that appears at a time of communicating by a portable information terminal. And the electronic paper file is provided with a receiving electronic paper displaying data sent from the other electronic paper and a sending electronic paper sending the display content to the other electronic paper.

18 Claims, 26 Drawing Sheets

U.S. PATENT DOCUMENTS

| | | | |
|---|---|---|---|
| 5,500,929 A * | 3/1996 | Dickinson | 715/776 X |
| 5,542,040 A * | 7/1996 | Chang et al. | 715/776 |
| 6,144,380 A * | 11/2000 | Shwarts et al. | 715/512 X |
| 6,212,534 B1 * | 4/2001 | Lo et al. | 715/511 |
| 6,229,502 B1 * | 5/2001 | Schwab | 345/1.1 |
| 6,486,895 B1 * | 11/2002 | Robertson et al. | 715/776 |
| 6,859,909 B1 * | 2/2005 | Lerner et al. | 715/512 |
| 7,069,518 B2 * | 6/2006 | Card et al. | 715/776 |
| 2004/0155833 A1 * | 8/2004 | Ishii et al. | 345/1.1 |

FOREIGN PATENT DOCUMENTS

| | | |
|---|---|---|
| JP | 03-009460 | 1/1991 |
| JP | 04-157517 | 5/1992 |
| JP | 04-160462 | 8/1992 |
| JP | 4-355786 | 12/1992 |
| JP | 04-355786 | 12/1992 |
| JP | 06-274458 | 9/1994 |
| JP | 06-342319 | 12/1994 |
| JP | 09-081475 | 3/1997 |
| JP | 10-164301 | 6/1998 |
| JP | 10-171620 | 6/1998 |
| JP | 11-502950 | 3/1999 |
| JP | 11-298881 | 10/1999 |
| JP | 2000-010655 | 1/2000 |
| JP | 2000-250501 | 8/2000 |
| JP | 2000-341659 | 12/2000 |
| JP | 2001-188502 | 7/2001 |
| JP | 2002-055651 | 2/2002 |

* cited by examiner

ELECTRONIC PAPER FILE

TECHNICAL FIELD

The invention relates to an electronic paper file attachable with a plurality of electronic papers comprising a sheet like display unit.

BACKGROUND ART

As the information society progresses in these years, it increases the technical importance on the display medium, the hard copying, and so on. However, the paper, which has been used as a medium for transporting the information over the years, has very high portability and storage stability. An in these days, a display medium has been developed that is like a paper and provided with a memory.

As the display medium mentioned above, the electronic paper is proposed (Published Japanese patent application No. 10-171620) and also the electronic paper file wherein a plurality of such electronic papers are formed in a notebook-like form (Published Japanese translation of PCT application, No. 11-502950). In addition, as a recording material of the display medium, various rewritable recording mediums are studied (Pages 209 to 251 of "Japan Hardcopy'99—The Collected Papers" published by The Imaging Society in Japan).

The electronic paper file has been improved in order to support the needs that, instead of printing letters and images on papers, the electronic paper is an information terminal to store letters and images as electronic information copiable and editable freely and it is configured like a book or a notebook that is familiar to us heretofore.

In other words, the electronic paper file is different from a conventional display device as represented by CRT display or LCD display and has a portable and notebook-like configuration. And unlike the portable information terminal (PDA: Portable digital Assistant, and notebook personal computer) and so on, the electronic paper file comprises a plurality of display units.

Now, some of the conventional portable information terminals are provided with a communication function, and by using such communication function those terminals can exchange information mutually in anywhere. The method of exchanging information is sending and receiving files, exchanging message in real time by means of communication tool (Chat), and the like. In case where an information terminal provided with the communication function is given to each participator of a conference and an image data regarding the conference data is transmitted to the information terminal, each participator can read the conference data on his information terminal without using the whiteboard.

However, the portable information terminal is provided with only one display in A4 size at most due to the portability performance. Therefore, the display has to be divided in order to browse the data consisting of plural documents or to input more data referring to a specific document, which may be an inconvenient environment.

When the user exchanges data by means of the communication tool or uses the information terminal at the conference, the display screen displays a common data (screen). Accordingly, it is very hard for each user to obtain spaces for inputting or displaying his information for which the user makes a note or browses a different page for his own benefit.

This is a reason that the above information terminal cannot substitute for the book or notebook with superior facility for browsing even though the terminal can store characters and images as electronic information along with involving the portability.

Therefore, the invention has an object to provide an electronic paper file with the merits of the book or notebook, wherein a problem regarding the displaying that appears on the information terminal particularly at the communication.

DISCLOSURE OF INVENTION

The present invention comprises following means in order to achieve the above object.

Specifically, the invention presupposes an electronic paper file attachable with a plurality of electronic papers with a display function. In the electronic paper file, a communication means sends and receives data to and from a different electronic paper file, a page management means specifies an electronic paper to send data in advance and then sends a data inputted to the electronic paper to the communication means.

Additionally, the page management means may specifies an electronic paper to display a received data and sends (displays) the data received by the communication means to the electronic paper to display said data.

According to the configuration provided with the above-mentioned means, it is possible to provide the electronic paper file with an advantage like a book or a notebook as well as the communication function. The electronic paper file can resolve a conventional problem that the display region of the portable terminal is small.

Moreover, the page management means specifies different electronic papers as an electronic paper to display the received data and an electronic paper to display the data to send respectively, and arranges two electronic papers with two facing pages The above-mentioned configuration can allow a user to use a large region instead of such conventional communication along with dividing one screen into two, as well as the data to be managed with ease.

In addition, the electronic paper displays the data sent from the other electronic paper file and sent characters and images written into the electronic paper to the other electronic paper. The electronic paper and an electronic paper provided with a input function are arranged so as to cover two facing pages.

Moreover, if the electronic paper is attached to the electronic paper file removably, it makes easy to manage the data per electronic paper.

And the page management means is arranged to comprise a cursor drawing means for displaying on a specific region of the electronic paper a cursor for indicating a region or a point, a display control means for controlling a data that the electronic paper can display, and a function control means for limiting a function of the electronic paper.

Such arrangement makes it possible to facilitate the use of the electronic paper because of more precise setting of functions.

And after an ID number for specifying an electronic paper is imparted to the electronic paper, the page management means may send the data to the electronic paper according to the ID number. For instance, when a user inputs to the page management means an ID number of an electronic paper to which he wants to send a data, the page management means can obtain the data to be displayed and send the data to the electronic paper specified by the user. In order that the user recognize the ID number with ease, the electronic paper file may be provided with an ID number obtaining means for obtaining the ID number.

To manage efficiently a plurality of electronic papers, the electronic paper file may be provided with a setting means for setting an electronic paper to a specific group according to the ID number. After setting a group according to the ID number, the setting means creates a mark to identify the group and sends to the electronic paper the display data to display the group mark. The electronic paper, on receiving the display information, displays the mark.

Therefore, the user can manage the electronic papers per group.

In addition to the above, instead of the communication means, the electronic paper may be provided with one of a pair of connecting terminals including both the electrical and physical connecting functions as well as the main unit may be provided with the other connecting terminal. The other connecting terminal may be fixed to the main unit, otherwise may be attached to the main unit rotatably.

BEST MODE FOR CARRYING OUT THE INVENTION

First, here are explained detailed configurations of an electronic paper 10 and an electronic paper file 30.

Figure 24:
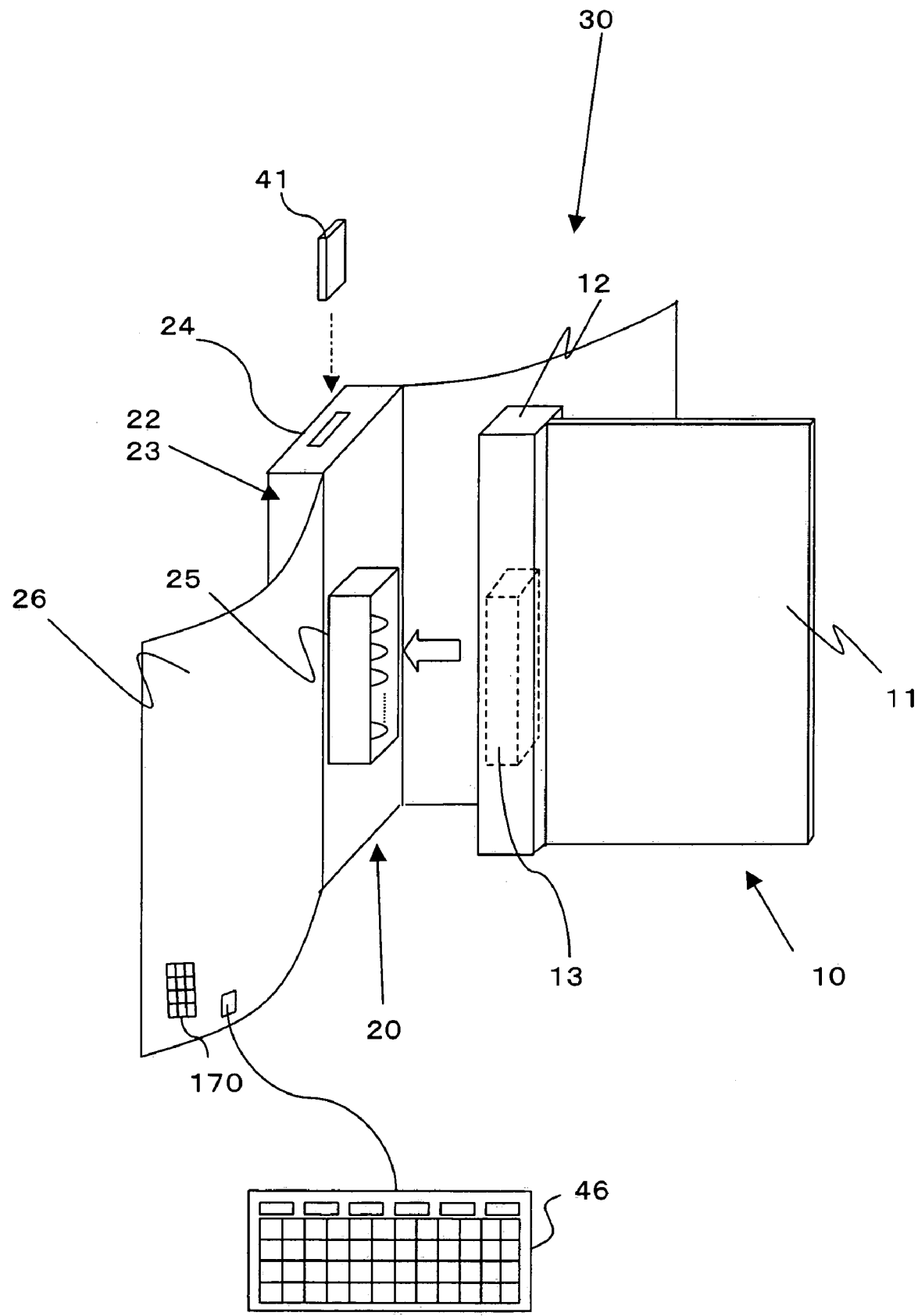
FIG. 24 is a schematic diagram of the electronic paper file.

As shown in FIG. 24, the electronic paper file 30 is configured so that the electronic paper 10 provided with a display driver unit 12 and a display 11 is attached to a main unit 20 providing a signal sending-receiving means 22 and a display light emitting control means 23 to a spine 24 by connecting terminals 13 and 25. And the main unit 20 is also connected electrically with the electronic paper 10 through connecting terminals 13 and 25. Additionally, the main unit 20 can comprise one or a plurality of connecting terminals 25. In case where a plurality of connecting terminals 25 are provided to the main unit 20, the main unit can be connected with a plurality of electronic papers.

The display light emitting control means 23 transfers a data received from the signal sending-receiving means 22 to the electronic paper 10 as display bit data, and at the same time, controls light emitted from an after-mentioned luminous sheet. The light emitting control here is to change an illumination of a region to be emphasized and to change a luminance of said region. Besides, the signal sending-receiving means 22 can receive a data from a personal computer connected to communicate, or obtain a data from a memory card storing said data, for example.

Figure 25:
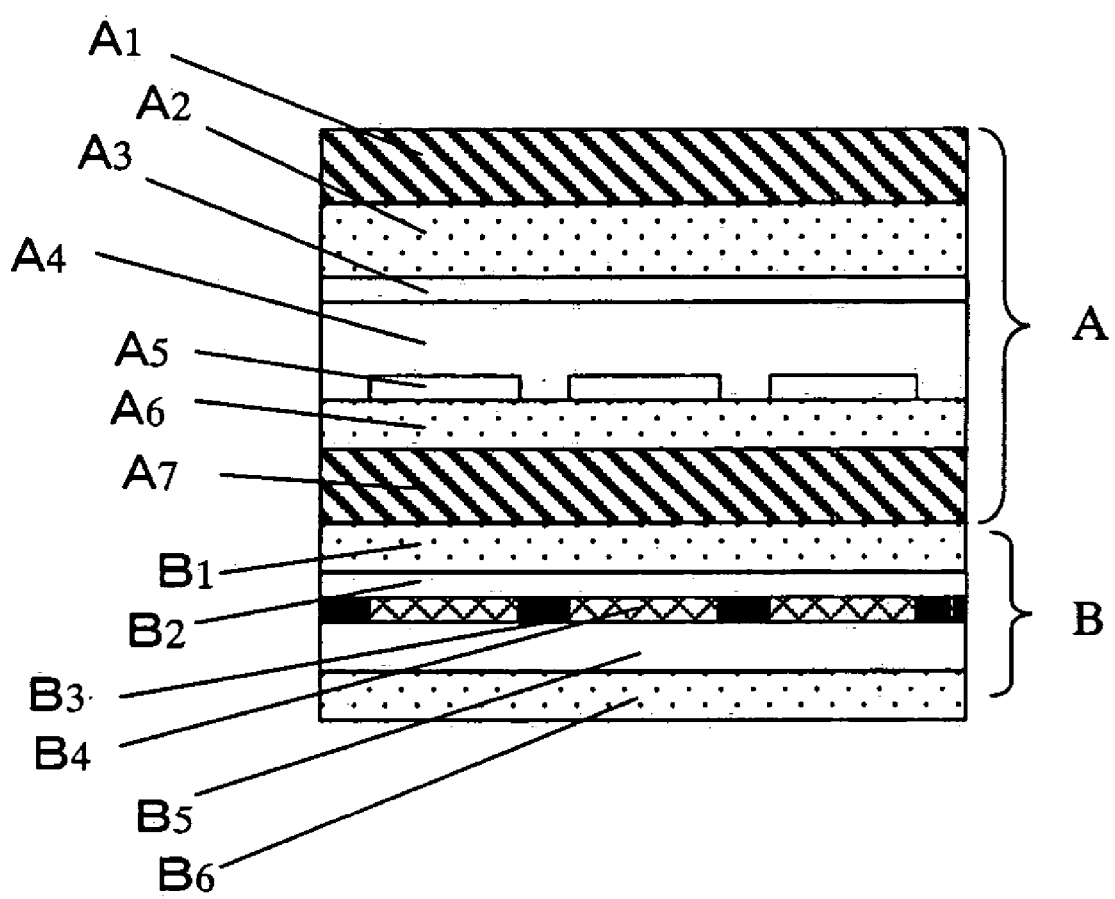
FIG. 25 is a diagram showing an example of a device configuration of a display sheet and a luminous sheet of the electronic paper.

Here, the display 11 comprises a display sheet A provided with a specific display medium, and a luminous sheet B for illuminating the display sheet, as shown in FIG. 25, of which configuration is explained as follows.

A transparent electrode (ITO electrode, for example) A3 is formed on an upper side base film A2, and a transparent electrode A5 is formed on a down side base film A6. Additionally, a display medium (a ferroelectric high polymer liquid crystal, for example) A4 is applied a specific thickness over the column electrode A5. Next, the line electrode A3 and the column electrode A5 are facing mutually and bonded so as to be lattice-like. Then, molecules of the display medium A4 are oriented in a specific direction. After that, they are bonded so as to insert them between polarizing plates A1 and A7. In result, the display sheet A is configured.

On the other hand, regarding the luminous sheet B, because the whole surface may emit light uniformly, an anode B2 (transparent common electrode) is formed on an upper side base film B1, a cathode B5 (common electrode) is formed on a down side base film B6, and a luminous medium (organic electro luminescence, for example) B4 is formed in a specific pattern on the cathode B5 by using a insulating layer B3. After that, the anode B2 and the cathode B5 are bonded so as to face mutually. Thereby the luminous sheet is configured in such way.

Finally, the luminous sheet B configured as above is boned to the down side of the display sheet A so that the luminous sheet B may illuminate the display sheet A.

Besides, the display medium A4 used for the display sheet A does not need to be limited a nonvolatile material as above. For instance, it may adopt as the display medium A4 a microcapsule that encapsulates coloring matters coupling with positively charged particles and agents coupling with negatively charged particles (agent of which pH is opposite to this coloring matter). The configuration of such microcapsule was disclosed in detail in Published Japanese translation of PCT application, No. 11-502950.

The displaying of the display sheet A is controlled by the matrix control utilizing the following shutter function. That is to say, when a specific voltage (positive voltage) is impressed between the line electrode A5 and the column electrode A3 of the display sheet A, molecules of the display medium A4 change the orientation to the direction not transmitting light (the shutter is ON), and thereby the pixels specified by the line electrode A5 and the column electrode A3 are displayed in black. On the other hand, when reverse voltage (negative voltage) to the specific voltage is impressed, the molecules of the display medium A4 change the orientation to the direction transmitting light (the shutter is OFF), and thereby those pixels are displayed in white.

On the other hand, when the voltage is impressed between the anode B2 and the cathode B5 of the luminous sheet B, the whole area of the luminous medium B4 emits light and illuminates the display sheet A. That is to say, when the luminous medium B4 emits light, pixels in regions that transmit this light (said pixels wherein the shutter are OFF) are formed.

Besides, the luminous medium B4 is formed in a specific pattern as described above. Accordingly, if the anode B2 and the cathode B5 of the luminous sheet B4 are configured to lattice-like distinctive electrodes (that is to say, the line electrode and the column electrode) and the voltages to be impressed is changed per distinctive electrode, it becomes possible to illuminate only a region to be emphasized, such as a title region.

Additionally, in case of making the luminous sheet B emit light in mono-color, a monochromatic light source may be provided to the whole area on the sheet uniformly. On the contrary, in case of making the luminous sheet B emit light in full-color, RGB (Red, Green, and Blue) light sources may be provided to the whole area of the sheet in lattice-like. Even in case of full-color, if it is necessary to make the whole area of the sheet emit light uniformly, it is sufficient that the light sources may be the anode B2 and the cathode B5 instead of the distinctive electrodes.

Figure 1:
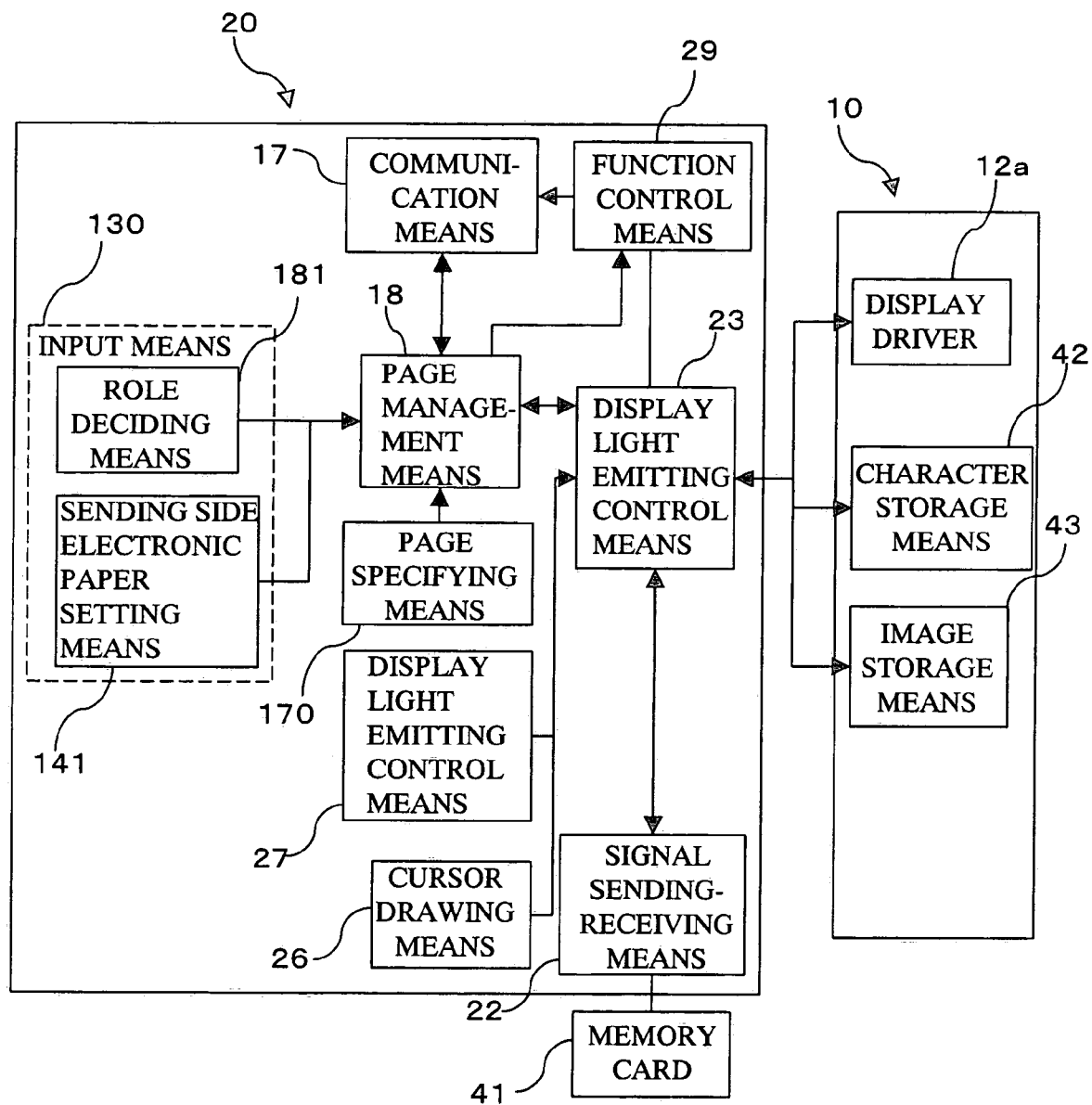
FIG. 1 is a block diagram showing an outline of an electronic paper file of the present invention.

A step of displaying data (character data, image data, and etc.) on the display 11 is explained here according to FIG. 1.

A user installs a memory card 41 storing contents of collected papers into the main unit 20. And he inputs "20", for example, by means of a page specifying means 170 comprising a ten-key and etc. provided to the main unit 20, as shown in FIG. 24. The page specifying means 170 informs a page management means 18 of the inputted "20".

The page management means 18 manages number of the electronic papers 10 connected with the connecting terminal 25 of the main unit 20 at any time during the period that the power of the electronic paper file 30 is on. When "20" is inputted from the page specifying means 170, the page management means 18 informs the display light emitting control means 22 of both the number of the electronic papers 10 connected with the main unit 20 for the communication, for example, 10 sheets, and the value inputted from the page specifying means 170 (in this case, "20").

The display light emitting control means 23 receives the number of the connected electronic papers 10 and "20" from the page management means 18, and then instructs the signal sending-receiving means 22 to obtain a data for pages 20 to 29 of the colleted papers from the memory card 41. According to such instruction, the signal sending-receiving means 22 obtains the data for 20 to 29 pages and then transmits the obtained data to the display light emitting control means 23.

The display light emitting control means 23 stores a character data out of the 20 to 29 pages data into a character storage means 42 as well as a image data into a image storage means 43, said means provided to the specific electronic paper 10. The character data comprises character codes such as ASCII code and a character region data representing a region on the display 11 displaying the characters. The image data comprises an image form data representing a form of an image, such as an image shape, an image pattern, and an image color, and an image region data representing a region on the display 11 displaying the image.

At the time of storing the character data in the character storage means 42 as above, the display light emitting control means 23 converts the character codes of the character data to a dot data in order to display said character data for 20 to 29 pages data of the collected papers on the display 11 of the electronic paper 10. The dot data comprises a color data, and a density data per dot.

In addition, according to the character data converted to the dot data and the corresponding character region data, the display light emitting control means 23 creates a display bit data comprising the color and density data of pixels displaying the characters on the display 11. For instance, after creating the display bit data, the display light emitting control means 23 sends the display bit data corresponding to the characters on page 20 to a first electronic paper 10 nearest to a cover 26, the display bit data corresponding to the characters on page 21 to a second electronic paper 10, . . . the display bit data corresponding to the characters on page 29 to a tenth electronic paper 10, that is, in sequential order the respective display bit data corresponding to the characters on each page are sent to respective electronic papers 10.

The display bit data sent to each electronic paper is received by a display driver 12a provided to each electronic paper 10. On receiving the display bit data, the display driver 12a generates pixels displaying the characters and voltage to be impressed on the pixels on the basis of the received display bit data.

Figure 26:
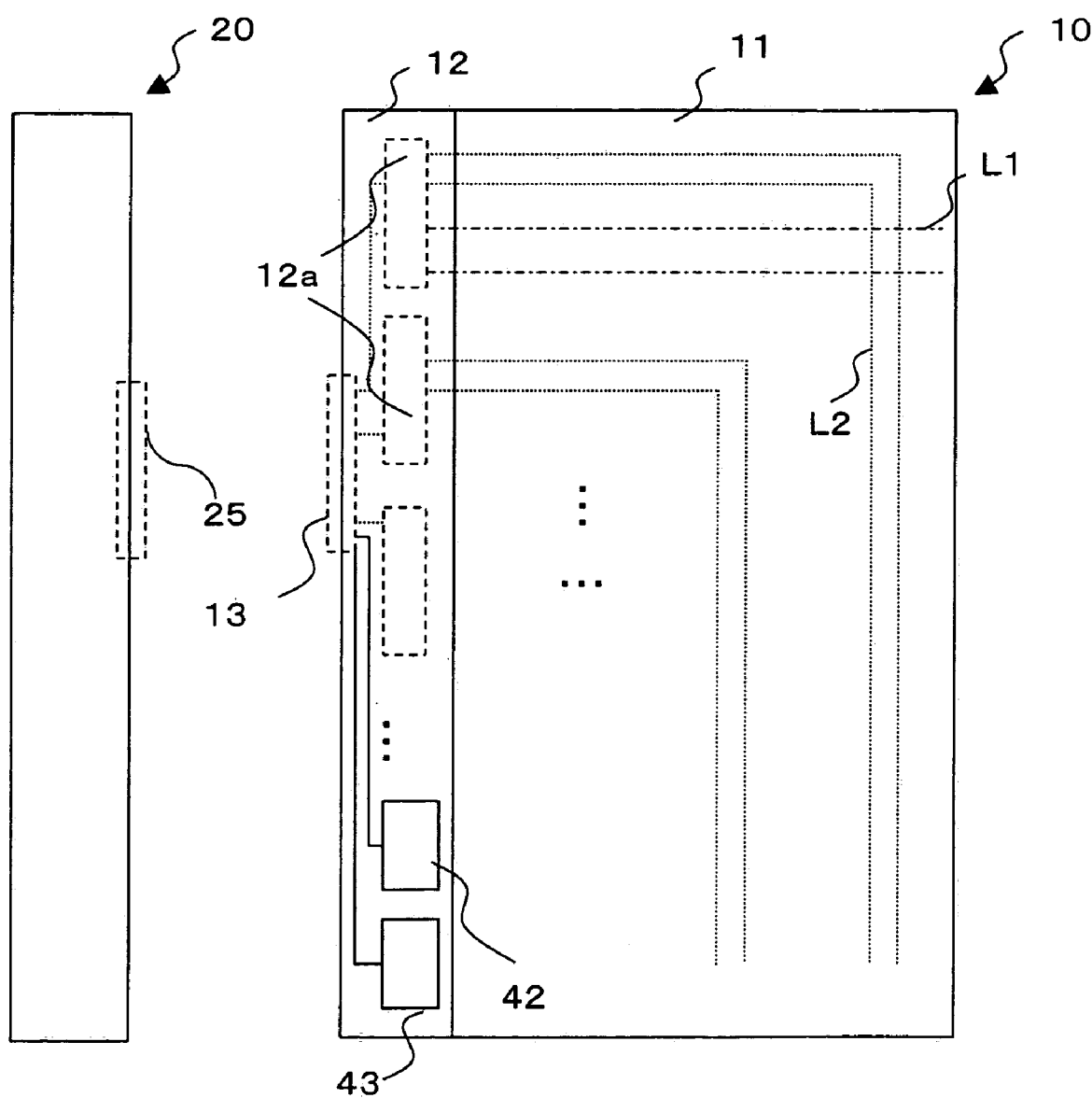
FIG. 26 is a schematic block diagram of the electronic paper.

Next, the display driver 12a impresses a specific voltage on the pixels displaying characters by means of a column wiring L2 and a line wiring L1 shown in FIG. 26. Thereby, the characters on pages 20 to 29 of the collected papers are displayed on the displays 11 of the electronic papers 10.

Additionally, on receiving from the image storage means 42 the image data on the pages 20 to 29 of the collected papers, the display light emitting control means 23 creates the display bit data from the image data in the same way as creating the display bit data from the character data. After creating the display bit data, the display light emitting control means 23 sends the display bit data to the display driver 12a.

The display driver 12a displays the image on the display 11 according to the received display bit data. Thereby, the characters on the pages 20 to 29 of the colleted pagers are displayed on the displays 11 of the electronic papers 10 together with the images.

Besides, in case where the display driver unit 12 of the electronic paper 10 is provided with the character storage means 42 and the image storage means 43 as shown in FIG. 26, even when the electronic paper 10 is removed from the main unit 20, the character data and the image data can be stored in the electronic paper 10. However, it is not always required to provide the electronic paper 10 with the character storage means 42 and the image storage means 43, and those storage means may be provided to the main unit 20. In the above description, the character and image data are read out from the memory card 41, but those data may be read from a recording medium such as CD-ROM, DVD-ROM, and a hard disk of the personal computer.

Next description relates to the editing processing for editing characters and images displayed on the electronic paper 10.

Figure 2:
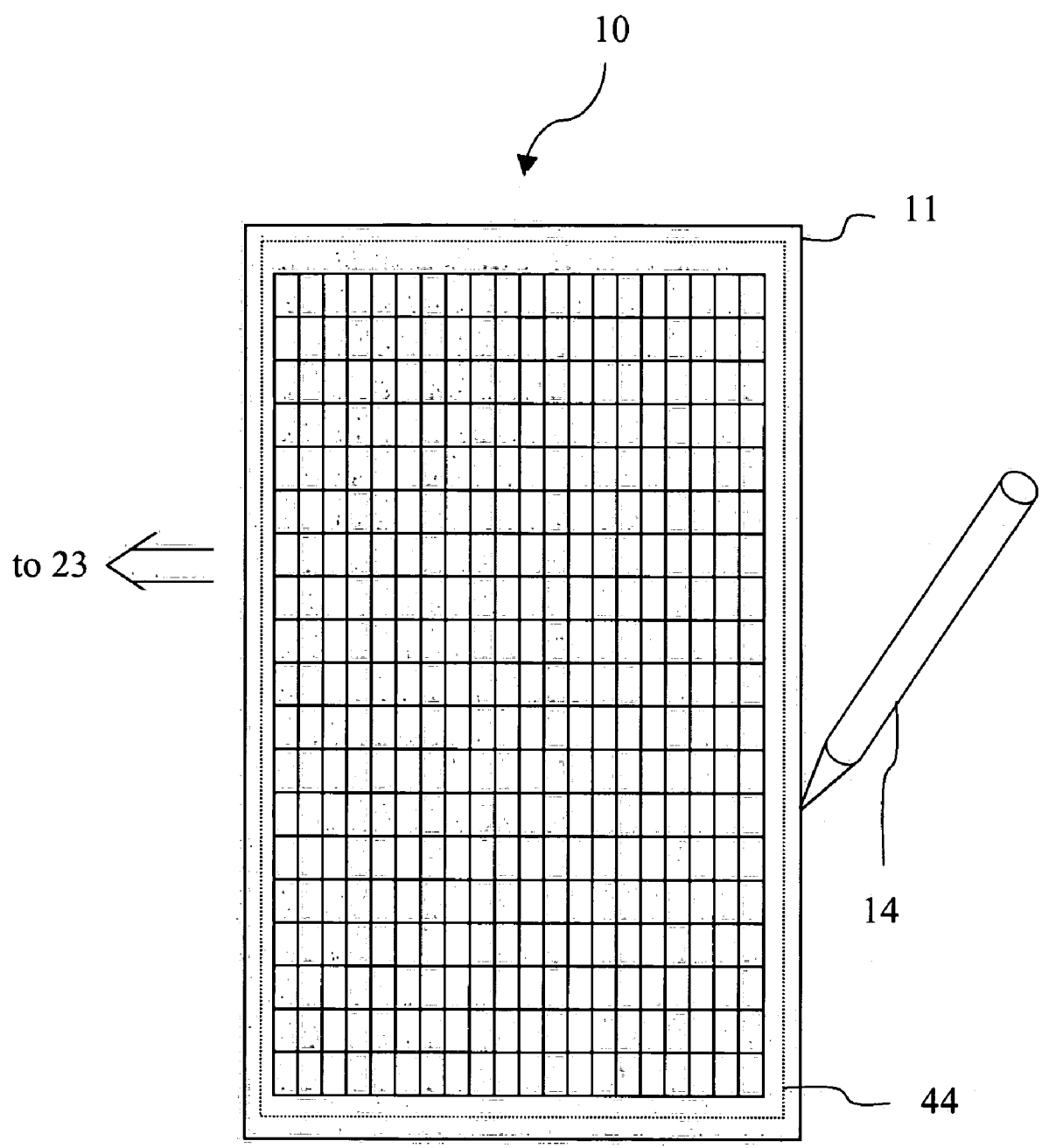
FIG. 2 is a diagram illustrating an image of an editorial operation of the electronic paper file using a writing device and a transparent sheet.

The electronic paper 10 for editing the characters and images on the display is a one shown in FIG. 2, of which display 11 is covered over the surface with a transparent sheet 44 provided with a digitizer function.

Under such configuration, when the user selects a color out of a color palette displayed on the electronic paper 10 and draws a desired image with a writing device 14 (a pointed device, such as a pen), the transparent sheet 44 detects using the digitizer function a position where the writing device 14 contacts with the transparent sheet 44. The transparent sheet 44 transmits the detected position of the contacting point to the display light emitting control means 23.

However, if the display light emitting control means 23 can detect a shape and a position of the image and patterns drawn by a pointing device (including a cursor working with the pointing device) like a mouse, the user may draw the characters and image on the transparent sheet 44 by means of such pointing device.

The display light emitting control means 23 recognizes the shape and pattern of the drawn image and the position of the drawn image on the basis of the user's specifying color and representing method (of drawing with a brush and a pen), and the position of contacting point. The display light emitting control means 23 creates the display bit data based on the recognized image's shape and pattern and the image position, and then stores such data in the image storage means 43.

After the display light emitting control means 23 stores the display bit data in the image storage means 43, the electronic paper 10 displays the contents according to the display bit data stored in the image storage mans 43.

In addition, in case of adding characters to the characters and images displayed on the electronic paper 10, the user specifies a region to add characters thereto by means of the writing device 14. The transparent sheet 44 sends the display light emitting control means 23 the region specified by the user.

The display light emitting control means 23 creates the character region data based on the region sent from the transparent sheet 44.

And next, the user inputs a specific character by means of the software keyboard implemented in the electronic paper 10 or the keyboard 46 connected with the main unit 20. The character code of the inputted character is inputted to the display light emitting control means 23. Besides, it may be arranged that the character can be added by means of the writing device 14, and in this case, it is preferable that the display light emitting control means 23 may be provided with a function to create the character code from the character written by the user.

The display light emitting control means 23 stores in the character storage means 42 the created character region data correlating with the character code of the character inputted from the keyboard 46.

After storing in the character storage 42 the character data such as the character code and the character region data, the display light emitting control means 23 creates the display bit data according to the stored character data in the character storage means 42 in a way as described above. And the display light emitting control means 23 sends the created display bit data to the display driver 12a. The display driver 12a displays on the electronic paper 10 the characters based on the received display bit data.

According to the above steps, it is possible to edit the displayed contents on the electronic paper 10.

EMBODIMENT 1

The explanation here relates to the communication between an electronic paper file 30A of a user A and an electronic Paper file 30B of a user B.

Figure 3:
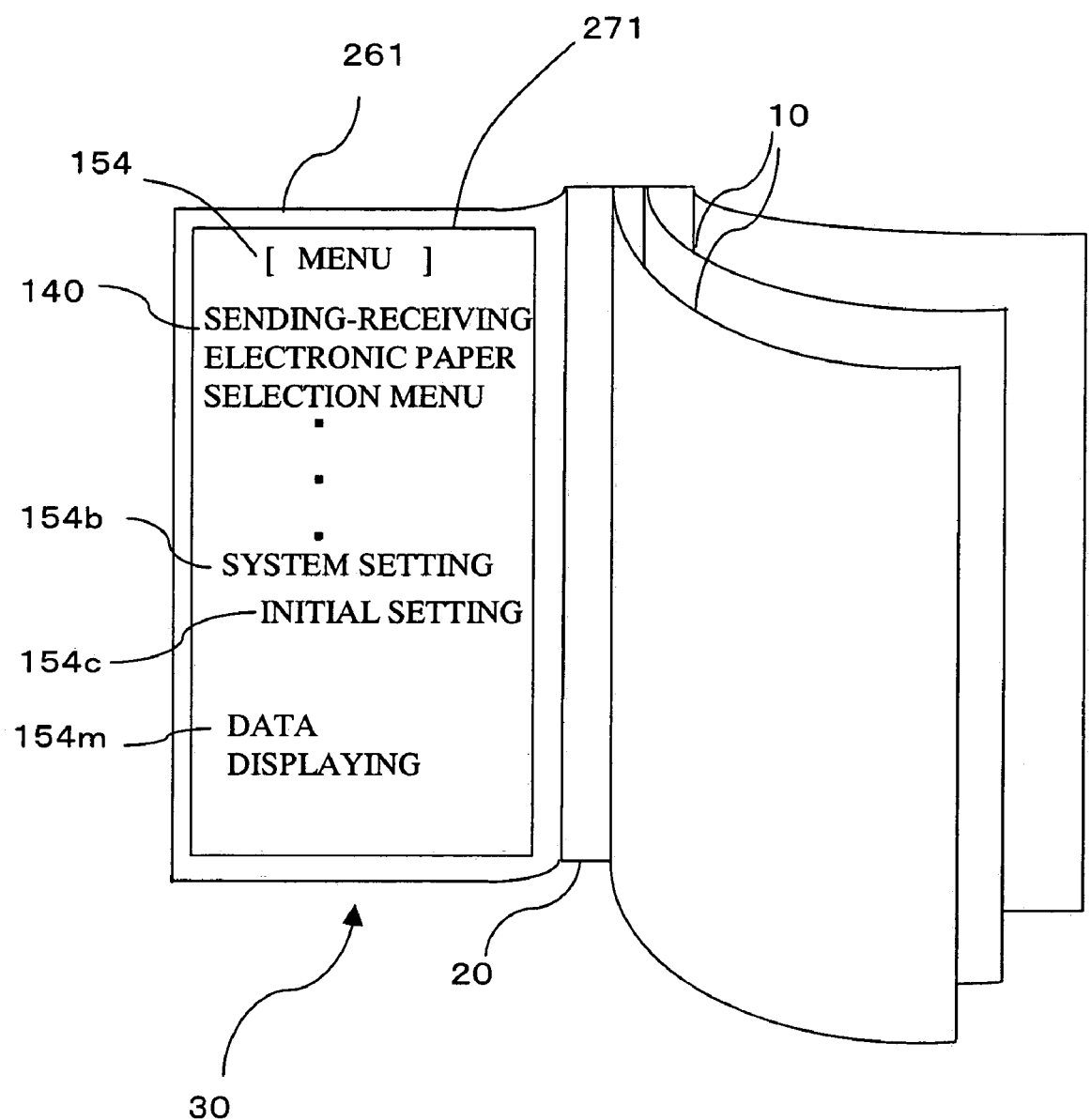
FIG. 3 is a diagram showing an example of a displayed menu.

When the user A turns the electronic paper file 30A on power, an input means 130 is activated and a menu 154 is displayed on a cover display 271 arranged on the backside of the covet 26 to inbut same items reciuired on operating as shown in FIG. 3. The user selects a sending-receiving electronic paper selecting menu 140 out of the menu 154 by means of the writing device 14.

Figure 4:
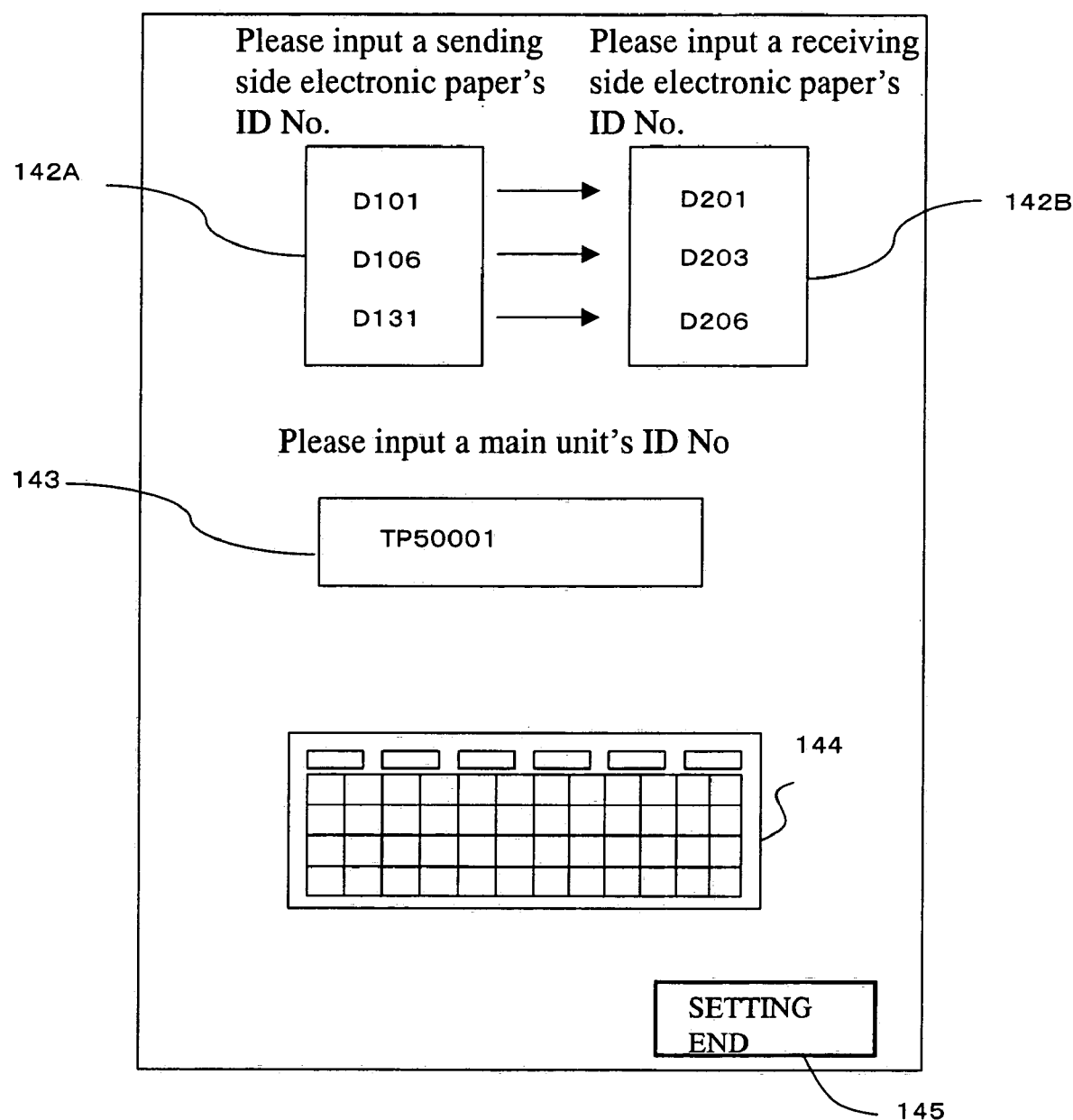
FIG. 4 is a diagram showing an example of a display of a cover display.

At this time, a sending-receiving electronic paper setting means 141 of the main unit 20 displays on the cover display 271 an input spaces 142A and 143 as shown in FIG. 4, said input space 142A for inputting an ID number of a sending side electronic paper 7A of which content is sent to the electronic paper 30B, and said input space 143 for inputting an ID number of the main unit 20 of the electronic paper file 30B which is a destination of the content.

Figure 5:
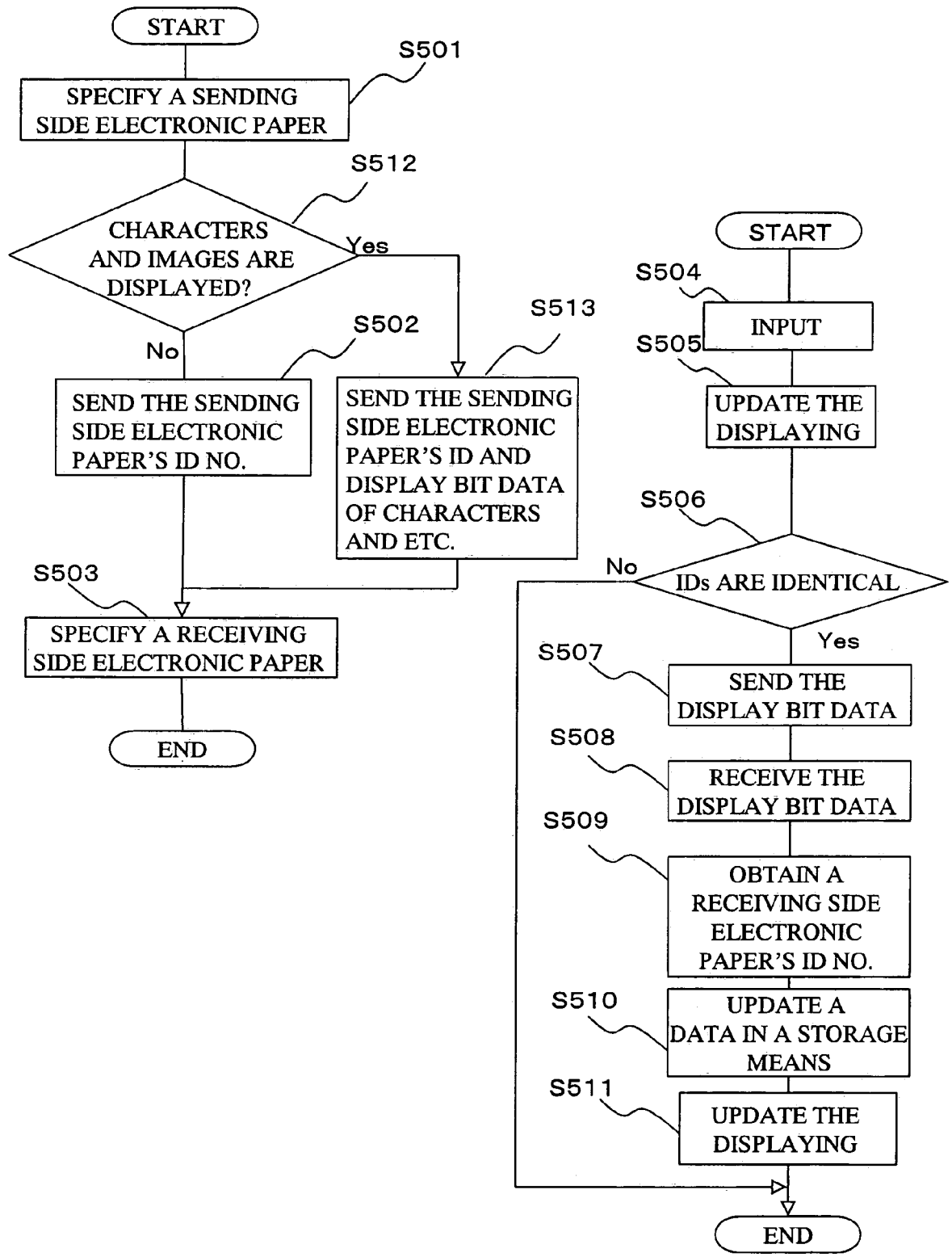
FIG. 5 is a flowchart showing a sending and receiving operation of the electronic paper file of the invention.

For instance, the user inputs as sending side electronic paper 7A, using the software keyboard 144, for example, one or a plurality of ID numbers of electronic papers among the electronic papers 10 connected with the electronic paper file 30A (FIG. 5, S501).

Besides, it is arranged that the display light emitting control means 23 recognize characters, numbers, and symbols, those inputted by the software keyboard. Therefore, the ID number inputted by the user A is recognized by the display light emitting control means 23, and then inputted to the page management means 18. The page management means 18 stores the inputted ID number.

The ID number is imparted by the page management means 18 to the electronic paper 10 connected with the main unit 20 of the electronic paper file 30A when it is turned on power, for example. Besides, in order that the user can know the ID number of the electronic paper, the page management means 18 may impart the ID number to an electronic paper in numerical order so that "1" may be imparted to the electronic paper near the cover 26. And the ID number may be a unique ID imparted to the electronic paper 10 in the manufacturing process.

Next, the user A inputs to the input space 143 the main unit ID (IP address, for example) of the electronic paper file 30B as a communication partner using the software keyboard 144. The inputted main unit ID is stored in the page management means 18 in the same way as the ID number of the sending side electronic paper 7A.

The user selects a setting end key 145 by means of the writing device 14, for example, after the input of the main unit ID.

When the setting end key 145 is selected, the sending-receiving electronic paper setting means 141 instructs the page management means 18 to send the inputted ID number of the sending side electronic paper 7A and the main unit ID to the electronic paper file 30B of the user B.

According to the instruction from the sending-receiving electronic paper setting means 141, the page management means 18 sends the stored ID number of the sending side electronic paper 7A and the main unit ID to a communication means 17.

The communication means 17 can communicate with the other device in the communication method such as the infrared data communication meeting the IRDA (Infrared Data Association) standard, the wired network communication, and so on. The communication means 17 sends the ID number of the sending side electronic paper file 7A to the electronic paper file 30B of the user B according to the main unit ID sent from the page management means 18 (FIG. 5, S502)

On receiving the ID number of the sending side electronic paper 7A sent from the electronic paper file 30A, the communication means 17 of the electronic paper file 30B transfers the received ID number to the page management means 18.

Figure 6:
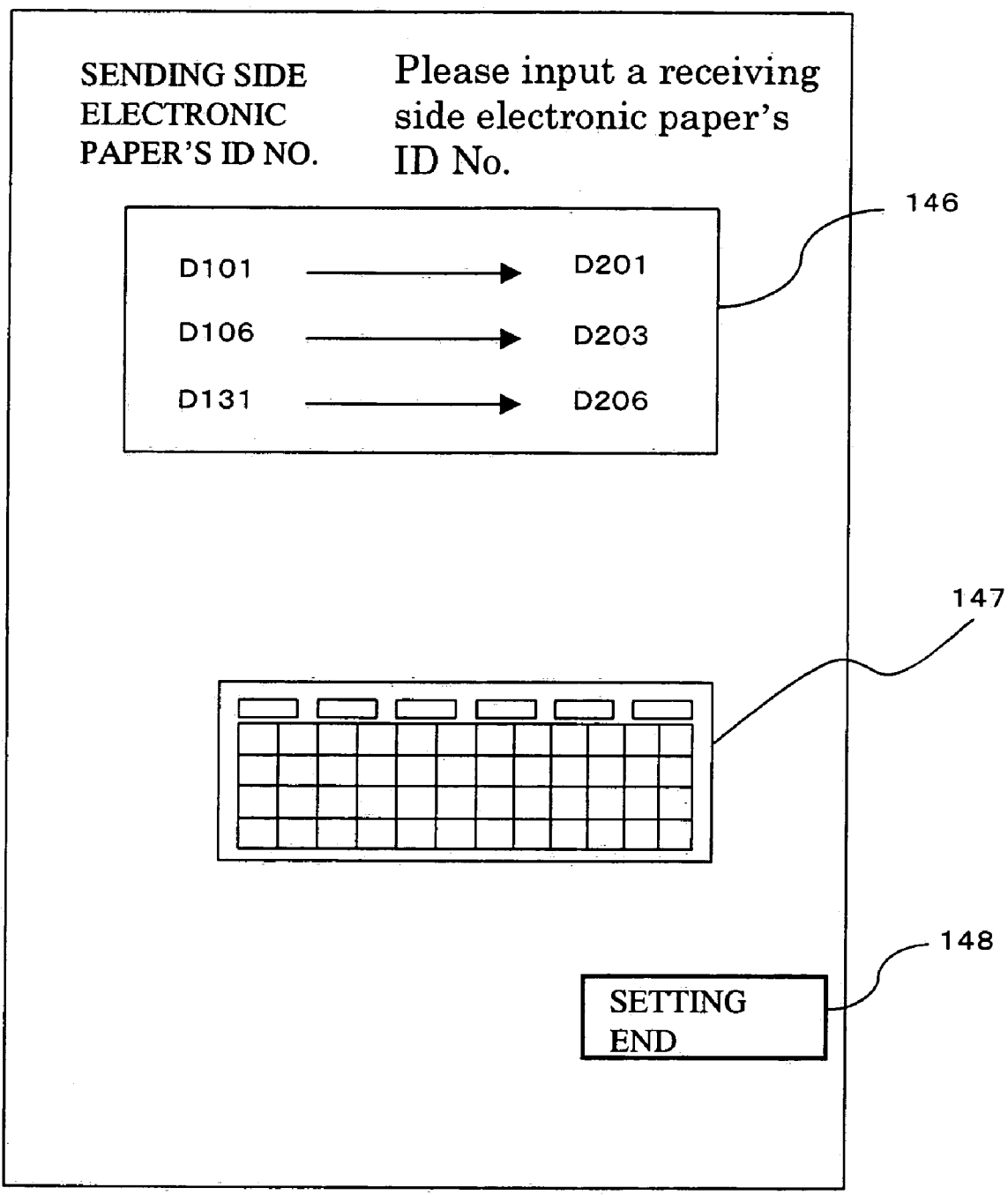
FIG. 6 is a diagram showing an example of a display of the cover display.

The page management means 18 receives and stores the ID number of the sending side electronic paper 7A. Additionally, the page management means 18 displays on the cover display 271 of the electronic paper file 30B an input space 146, as shown in FIG. 6, for displaying the stored ID number of the sending side electronic paper 7A, and inputting an ID number of a receiving side electronic paper 8B to display the content of the sending side electronic paper 7A.

At this time, as receiving side electronic paper 8B the user B inputs by means of a software keyboard 147 the ID numbers of the electronic paper so as to correspond to respective sending side electronic papers 7A, and those selected from electronic papers connected with the electronic paper file 30B (FIG. 5, S503). When the user B inputs the ID numbers of the receiving side electronic papers 8B and then selects the setting end key 148 with the writing device 14, the page management means 18 stores the ID numbers of the receiving side electronic papers 8B correlating with the ID numbers of the sending side electronic papers 7A.

After that, the page management means 18 notifies through communication means 17 the electronic paper file 30A that both the receiving side electronic paper 8B and the sending side electronic paper 7A are stored correlating with each other. The page management means 18 of the electronic paper file 30A receives this notification through communication means 17 and displays the notification on the cover display 271, for example.

In the above steps, the users A and B input the ID numbers of the electronic papers to be the sending side electronic paper 7A and the receiving side electronic paper 8B respectively. However, instead of the ID numbers of the sending side electronic papers 7A and the receiving side electronic papers 8B, a page number of the electronic papers 7A and 8B may be inputted (for example, where the third page of the electronic paper file 30A is the sending side electronic paper 7A, the user A inputs "3").

Besides, it may be arranged so as to input both the ID numbers of the sending side electronic papers 7A and the receiving side electronic papers 8B from either the electronic paper file 30A or the electronic paper file 30B.

For instance, in case where the receiving side electronic paper 8B is also set from the sending side electronic paper 30A, the steps are as follows. When the sending side electronic paper selecting menu 140 is displayed, the sending-receiving electronic paper setting means 141 displays on the cover display 271 an input space 142B in addition to the input space 142A, the input space 142B for inputting the ID number (or the page number) of the receiving side electronic paper. The user A inputs into the input spaces 142A and 142B the ID numbers of the sending side electronic paper 7A and the receiving side electronic paper 8B, respectively.

The page management means 18 obtains the ID numbers inputted into the input spaces 142A and 142B and send the obtained ID numbers to the electronic paper file 30B through communication means 17.

The page management means 18 of the electronic paper file 30B receives the ID number of the receiving side electronic paper, and then decides that the electronic paper specified by the received ID number is the receiving side electronic paper 8B.

Accordingly, in the above-mentioned case where both the sending side electronic paper 7A and the receiving side electronic paper 8B are sent from the electronic paper file 30A of the sending side, the user B does not need to specify the receiving side electronic paper 8B.

On the other hand, in case where the sending side electronic paper 7A is also set from the receiving side electronic paper 30B, the user A inputs by means of the software keyboard that the electronic paper file 30B specifies both the sending side electronic paper 7A and the receiving side electronic paper 8B. And the page management means 18 transmits the inputted instruction to the electronic paper file 30B through communication means 17.

On receiving the instruction sent from the page management means 18, the page management means 18 of the of the electronic paper file 30B let the user B input the ID number of the receiving side electronic paper 8B in the same way. After the ID number is inputted by the user B, the page management means 18 displays on the cover display 271 an advise the user B to input the ID number (or the page number) of the electronic paper 7A of the electronic paper file 30A as the sending side electronic paper.

If the user B inputs "1" as the page number, for example, the page management means 18 transmits the inputted page number to the electronic paper file 30A through communication means 17.

The page management means 18 of the electronic paper file 30A receives the page number, and then decides that the first electronic paper 10 is the sending side electronic paper 7A.

When both the sending side and receiving sides electronic papers 7A, 8B are selected as above, the page management means 18 displays said results on the cover display 271 of the electronic paper file 30A.

Subsequently to such display, the user A selects a color and a expression method, and then draws an image on the transparent sheet 44 of the sending side electronic paper 7A with the writing device 14 (FIG. 5, S504). The transparent sheet 44 detects a position of a point contacting to the writing device 14 by means of the digitizer function, and then sends the display light emitting control means 23 said information along with the ID number of the sending side electronic paper 7A on which the image was drawn.

The display light emitting control means 23 creates a display bit data according to the contacting point position sent from the transparent sheet 44 and the color and the expression method selected by the user A. The created display bit data is stored in the image storage means 43 correlating with the ID number sent from the transparent sheet 44. The display light emitting control means 23 displays on the electronic paper the contents based on the stored information in the image storage means 43 (FIG. 5, S505).

Additionally, the display light emitting control means 23 sends the page management means 18 the created display bit data and the ID number correlated with the display data.

On receiving the display bit data and the ID number, the page management means 18 compares the received ID number with the stored ID number of the sending side electronic paper 7A in order to confirm if the electronic paper on which the image was drawn is the sending side electronic paper 7A or not.

Only if the ID numbers are identical, that is to say, only if the image was drawn on the sending side electronic paper 7A, the page management means 18 transmits the ID number and the display bit data to the communication means 17.

On receiving the display bit data and the ID number, the communication means 17 processes the display bit data and the ID number in a format based on a specific communication standard, and then sends the processed data to the electronic paper file 30B as the destination (the user B) (FIG. 5, S506 Yes to S507).

According to the above steps, the image data inputted to the sending side electronic paper 7A is received by the communication means 17 of the electronic paper file 30B as communication partner (the User B) through communication means 17 (FIG. 5, S508).

The display bit data and the ID number received by the communication means 17 of the electronic paper file 30B are given to the page management means 18.

According to the correlated relation between the ID number of the sending side electronic paper 7A and the ID number of the receiving side electronic paper 8B, the page management means 18 obtains the ID number of the receiving side electronic paper 8B corresponding to the ID number of the sending side electronic paper 7A (FIG. 5, S509). The page management means 18 correlates the obtained ID number of the receiving side electronic paper 7A with the display bit data obtained from the communication means 17, and then transmits said information to the display light emitting control means 23.

The display light emitting control means 23 stores in the image storage means 43 of the specified electronic paper the ID number of the receiving side electronic paper and the display bit data, and thereby the stored information in the image storage means 43 is updated (FIG. 5, S510). The display light emitting control means 23 transmits the display bit data stored in the image storage means 43 to the display driver 12a.

The display driver 12a display on the display 11 the image based on the transmitted display bit data (FIG. 5, S511).

As described above, the image that the user A has drawn on the electronic paper file 30A is displayed on the electronic paper file 30B.

Moreover, in case where the user A specifies a region to input characters with the writing device 14 and inputs characters by the keyboard 46 or the software keyboard, the display light emitting control means 23 obtains the region specified by the user A, the ID number of the sending side electronic paper 7A on which the user has specified the region, and the character codes of the inputted characters.

The display light emitting control means 23 creates the character region data based on the region specified by the user. And the display light emitting control means 23 correlates the character region data, the character codes inputted from the keyboard 46 and the ID number of the sending side electronic paper 7A respectively, and then said information are stored in a character storage means 42 of the specified electronic paper 10. In addition, the display light emitting control means 23 transmits to the page management means 18 the stored character region data, character codes, and ID number with being correlated with each other.

The character region data, ID number of the sending side electronic paper 7A, and character codes received by the page management means 18 are sent to the communication means 17 of the electronic paper file 30B in the same way as the steps of transmitting the display bit data and the ID number to the communication means 17 of the electronic paper file 30B.

The character region data, ID number of the sending side electronic paper, and character codes received by the communication means 17 of the electronic paper 30B are given to the page management means 18.

The page management means 18 obtains an ID number of the receiving side electronic paper 8B corresponding to the received ID number of the sending side electronic paper 7A, and then transmits the obtained ID number of the receiving side electronic paper 8B, character region data, and character codes to the display light emitting control means 23.

The display light emitting control means 23 of the electronic paper 8B stores the character region data and the character codes in the character storage means 42 of the specified electronic paper 10, and thereby the stored information in the character storage means 42 is updated. And the display light emitting control means 23 creates the display bit data based on the updated information in the same way as mentioned above, and the display bit data is transmitted to the display driver 12a of the receiving side electronic paper 8B. The display driver 12a displays the received display bit data on the display 11 of the receiving side electronic paper 8B, and thereby the characters inputted by the user A are displayed on the receiving side electronic paper 8B.

As described above, two electronic paper files can send and receive characters and images each other. And since the receiving side electronic paper 8A is specified so as to correspond to respective sending side electronic papers 7A, the characters and images drawn on a specific sending side electronic paper 7A are displayed on the corresponding receiving side electronic paper 8B.

Additionally, when the page management means 18 of the electronic paper file 30A transmits the ID number of the sending side electronic paper 7A to the electronic paper file 30B, there is occasion when the sending side electronic paper 7A are displaying the display bit data. In such case, the page management means 18 may transmit the display bit data and the character data along with the ID number of the sending side electronic paper 7A to the electronic paper file 30B.

Besides, in such case of sending the electronic paper file 30B the ID number of the sending side electronic paper 7A, the page management means 18 inquiries the display light emitting control means 23 whether the sending side electronic paper 7A are displaying any characters or images (FIG. 5, S512). If the images or characters are displayed, the display light emitting control means 23 sends the page management means 18 the display bit data of the image and the character data of the characters that are concerned with the current displaying.

On receiving the display bit data and character data sent from the display light emitting control means 23, the page management means 18 sends the electronic paper file 30B the received display bit data and character data together with the ID number of the sending side electronic paper 7A (FIG. 5, S513).

EMBODIMENT 2

Like the embodiment 1, the user A specifies the sending side electronic paper 7A among the electronic papers 10 of the electronic paper file 30A, as well as the user B specifies the receiving side electronic paper 8B among the electronic papers 10 of the electronic paper file 30B.

In addition to the above steps, the users A and B take following steps in this embodiment. The user B specifies from the electronic papers 10 of the electronic paper file 30B a sending side electronic paper 7B of which display content is sent to the electronic paper file 30A, as well as the user A specifies from the electronic papers 10 of the electronic paper file 30A a receiving side electronic paper 8A corresponding to the sending side electronic paper 7B specified by the user B. According to such steps, the sending side and receiving side electronic papers are set on the respective electronic paper files 30A and 30B of the users A and B.

Figure 7:
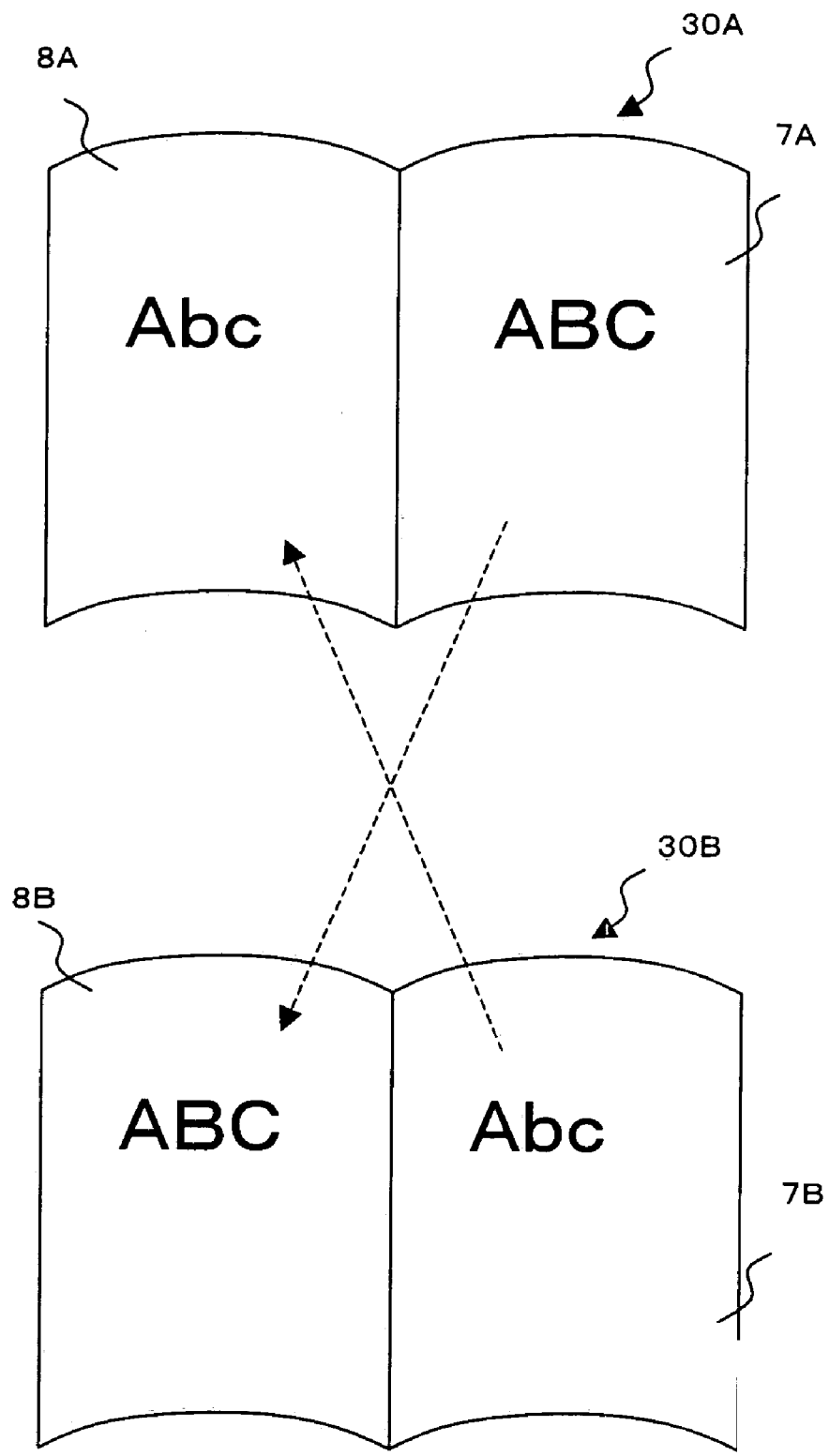
FIG. 7 is a diagram illustrating an image of a working of the electronic paper file of the embodiments 1 and 2.

As shown in FIG. 7, in case where the user A draws images and characters on the sending side electronic paper 7A like in the embodiment 1, for example, the receiving side electronic paper 8B of the electronic paper file 30B displays the characters and images drawn by the user A. And, when the user B draws characters and images on the sending side electronic paper 7B, the receiving side electronic paper 8A of the electronic paper file 30A displays the images and characters drawn by the user B.

In addition, the sending side electronic paper and the receiving side electronic paper are provided to a right and left sides of a double-spread pages as shown in FIG. 7, and thereby the user can drawn images and characters to be sent to the communication partner while browsing the images and characters sent from the communication partner.

If different electronic papers 10 are respectively specified as the sending side electronic paper and the receiving side electronic paper, the writing region of images and characters to be sent to the communication partner and the display region of images and characters to be received from the communication partner can be made into the same size as the display 11 of the electronic paper 10.

If each of the sending side electronic paper and the receiving side electronic papers is provided with the image storage 43 and the character storage 42, the characters and images displayed on the sending side electronic paper and the receiving side electronic paper may be stored in the image storage 43 and the character storage 42 of respective electronic papers. According such arrangement, the user can manage the transmittal log and the receiving log of the images and characters with ease.

EMBODIMENT 3

Figure 8:
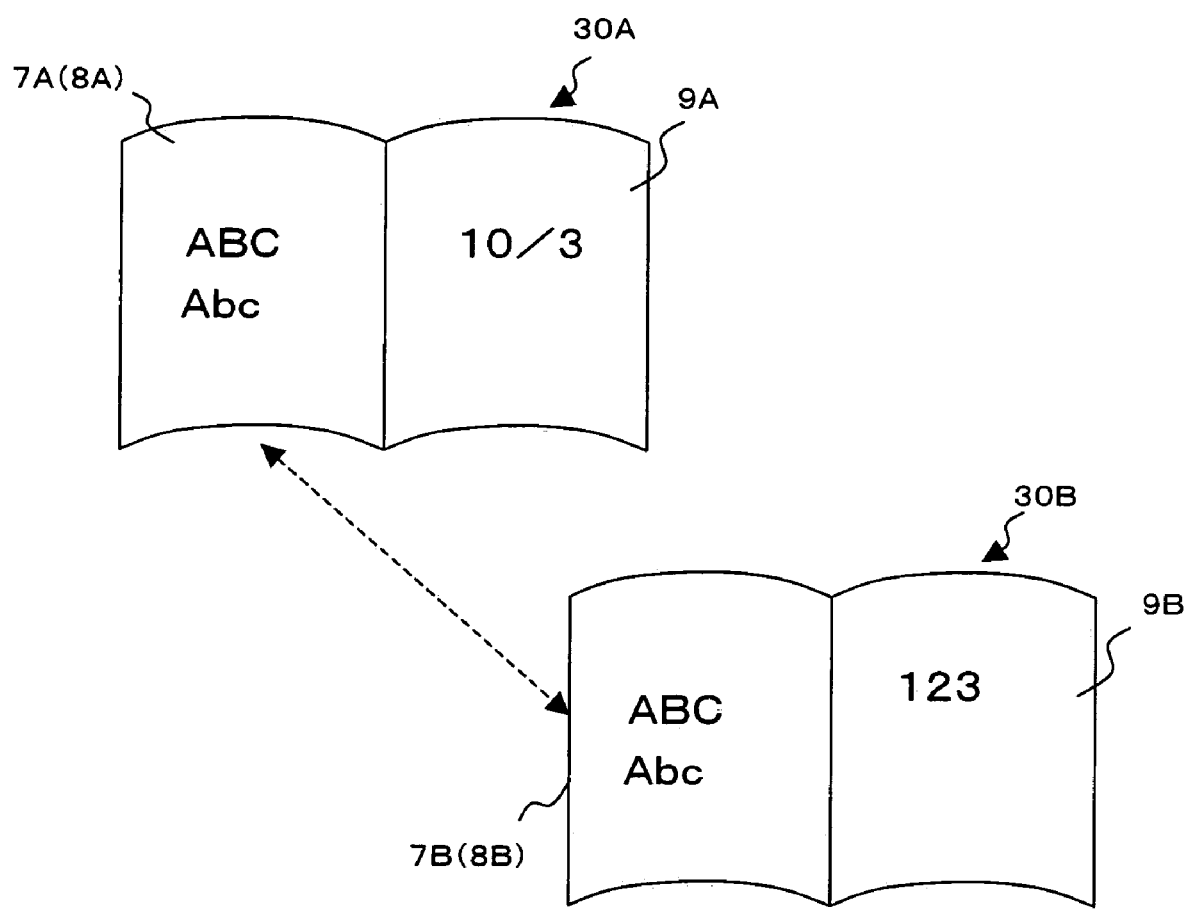
FIG. 8 is a diagram illustrating an image of the working of the electronic paper file of the embodiment 3.

In FIG. 8, the user A specifies from the electronic papers 10 of the electronic paper file 30A the sending side electronic paper 7A of which display content is sent to the electronic paper 30B.

The user B specifies the receiving side electronic paper 8B to display the display content of sending side electronic paper 7A. And then, the electronic paper 10 specified as the receiving side electronic paper is specified by the user B as the sending side electronic paper 7B of which display content is sent to the electronic paper file 30A.

The user A specifies the electronic paper same as the sending side electronic paper as the receiving side electronic paper 8A for displaying the display content of the sending side electronic paper 7B.

According to the above steps, the electronic papers 7A(8A) and 7B(8B) become a sending-receiving electronic paper provided with both functions of the sending side and receiving side electronic paper.

Accordingly, as shown in FIG. 8, when the user draws images on the sending side electronic paper 7A(8A) of the electronic paper file 30A, the images are displayed on the receiving side electronic paper 7B(8B) of the electronic paper file 30B. Likewise, the images drawn on the receiving side electronic paper 7B(8B) of the electronic paper file 30B is displayed on the receiving side electronic paper 8A(7B) of the electronic paper file 30A.

In addition, the users A and B can use the other electronic papers 9A, 9B except the sending-receiving electronic papers to make a note on it during the communication, as shown in FIG. 8. And it is arranged so that such memorandums written into the electronic papers 9A, 9B are not sent to the communication partner.

As the above, the electronic paper file 30 provided with the sending-receiving electronic papers is available for a conference.

In other words, while a promoter of the conference displays a data and agenda for the conference to be discussed on the sending-receiving electronic papers of his electronic paper file, said items are displayed on the sending-receiving electronic papers of the electronic paper file 30 given to each participator of the conference. If the participator writes his questions and opinions on the sending-receiving electronic paper, those written questions and opinions are displayed on the sending-receiving electronic paper of each participator.

Moreover, each participator can take notes on the electronic papers, not on the sending-receiving electronic paper.

Therefore, in case where the display region for displaying the data and agenda for the conference to be discussed and the opinions is set on a different electronic paper from that for displaying the region for memorandum, the displaying region and the region for memorandum can be made into the same size as the display 11 of the electronic paper.

EMBODIMENT 4

Figure 9:
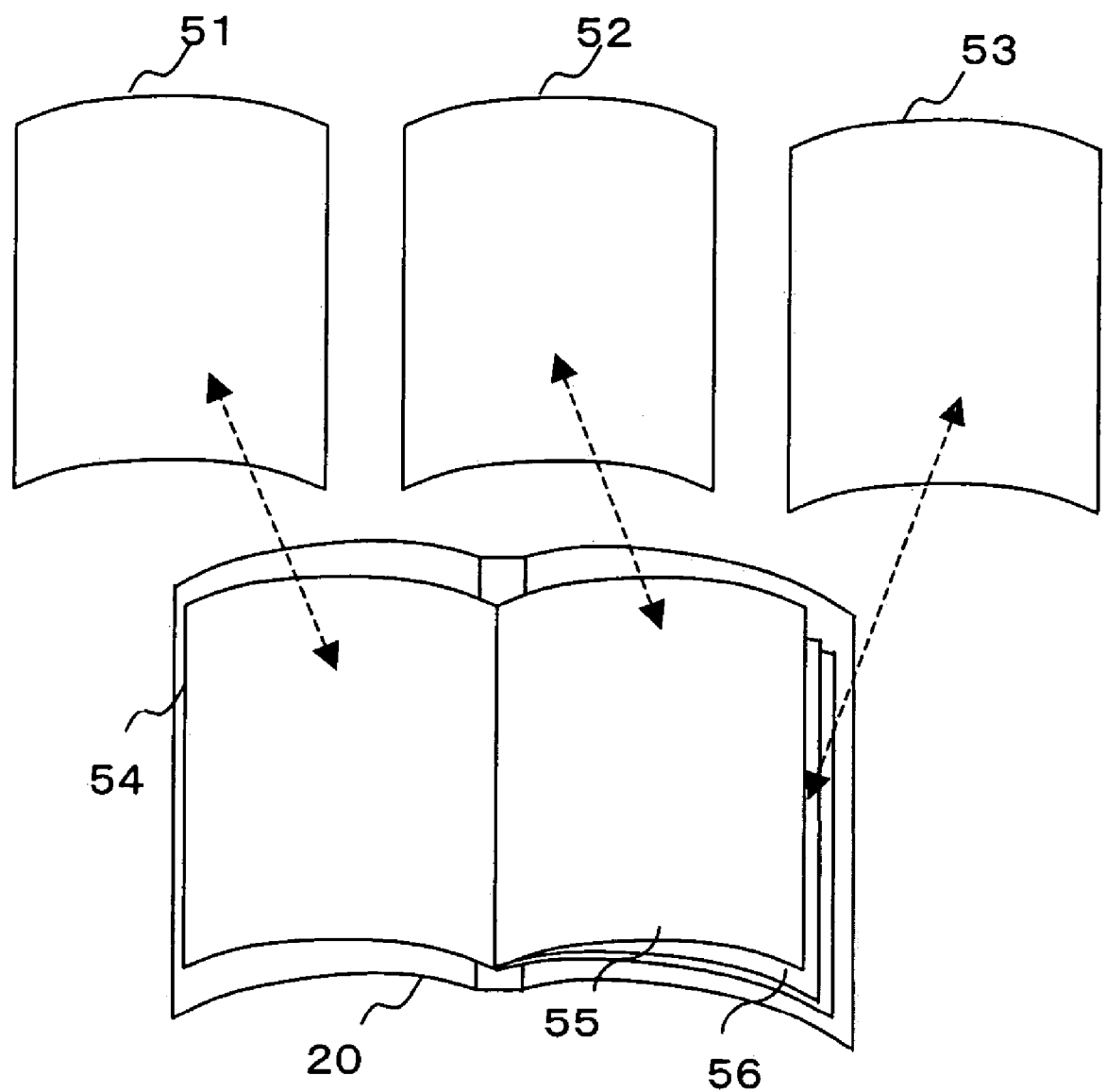
FIG. 9 is a diagram illustrating an image of the working of the electronic paper file of the embodiment 4.

This embodiment relates to an example as shown in FIG. 9 that electronic papers 54 to 56 connected with the main unit 20 manage images and characters inputted to electronic papers 51 to 53 physically detached from the main unit 20. The respective electronic papers 51 to 53 and 54 to 56 are provided with the communication means, the display light emitting control means 23, and the page management means 18. And the communication means provided to the electronic paper can communicate with the communication means 17 of the main unit 20 by the infrared data communication.

A user sets the electronic papers 51 and 54 to a sending-receiving electronic paper 9 in order that the display content of electronic paper 51 is displayed on the electronic paper 54, and the display content of the electronic paper 54 is displayed on the electronic paper 51. Likewise, a pair of the electronic papers 52 and 55 and a pair of the electronic papers 53 and 56 are set to a sending-receiving electronic paper respectively. The detailed setting method is the same as mentioned in the embodiment 3.

According to such setting, the characters and images inputted to the electronic papers 51 to 53 are displayed on the electronic papers 54 to 56, respectively.

When the electronic papers set as above are detached from the main unit 20 and are used as a response sheet of a paper test, it makes it easy to collect the response sheets.

Specifically, a proctor sends examination questions to respective sending-receiving electronic papers distributed to answerers, and the answerers write answers into each sending-receiving electronic paper. At the end of the examination time, the written answers are sent to the page management means 18 of the main unit 20 of the proctor. The page management means 18 displays the received answers on the sending-receiving electronic papers of the main unit 20. And the proctor passes the main unit 20 to a grader. Accordingly, the proctor does not need to collect the electronic papers from the answerers.

EMBODIMENT 5

Figure 10:
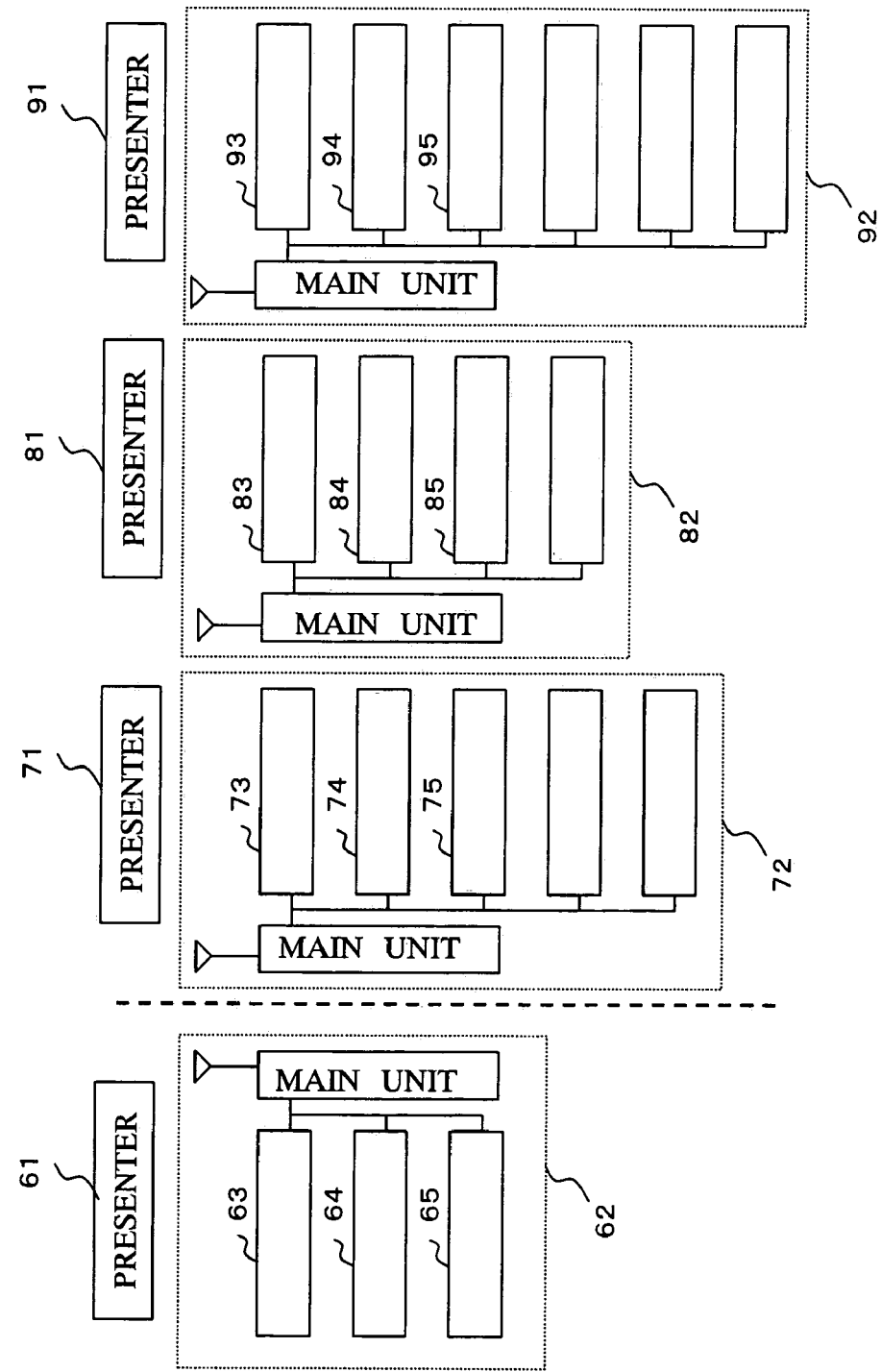
FIG. 10 is a diagram illustrating an image of the working of the electronic paper file of the embodiment 5.

In this embodiment, with reference to FIG. 1 and FIG. 10, an electronic paper file that gives a presentation by means of the communication means 17 is explained here. In this embodiment 5, the main unit 20 is provided with a cursor drawing means 26 and a display control means 27, and said both means will be described later.

In FIG. 10, a electronic paper file 62 used by a presenter 61 is provided with electronic papers 63 to 65, while each electronic paper file 72, 82 and 92 used by audiences 71, 81 and 91 is provided with electronic papers 73 to 75, 83 to 85 and 93 to 95, respectively. In this case, in order to display the same display content on every electronic paper of the electronic paper 63 of the presenter 61 and respective audiences' electronic papers 73, 83 and 93, all of four electronic papers are specified as a sending-receiving electronic paper.

Likewise, in order to display the same display content on every electronic paper of the electronic paper 64 and the respective audiences' electronic papers 74, 84 and 94, and in order to display the same display content on every electronic paper of the electronic paper 65 and the respective audiences' electronic papers 75, 85 and 95, these electronic papers are specified as a sending-receiving electronic paper. The specifying method in this embodiment is the same as in the embodiment 3.

The electronic paper file 62 of the presenter 61 is provided with the cursor drawing means 26 for displaying a cursor on each electronic paper 63, 64, and 65. Therefore, the presenter 61 can give a presentation displaying the cursor on the electronic paper.

For instance, the presenter 61 displays a software menu on the electronic paper 63 with the writing device 14, and selects "cursor drawing" of the menu.

The transparent sheet 44 sends the display light emitting control means 23 the information to the effect that "cursor drawing" is selected. On receiving the information, the display light emitting control means 23 activates the cursor drawing means 26.

And the presenter 61 points out a specific position on the electronic paper 63 with the writing device 14, then the transparent sheet 44 sends the display light emitting control means 23 the ID number of the electronic paper 63 and the information of the position (which is called "position information", hereinafter) pointed by the presenter. On receiving the information, the display light emitting control means 23 obtains a cursor display data (a cursor color, a cursor size, etc.) concerned with the displaying of the cursor from the cursor drawing means 26. And then, the display light emitting control means 23 sends the display driver 12a of the electronic paper 63 the position information and the display data. The display driver 12a displays the cursor on the position pointed by the writing device 14 of the presenter according to the cursor display data and the position information thus received.

While displaying the cursor on the electronic paper 63, the display light emitting control means 23 sends the page management means 18 the position information, the cursor display data and the ID number of the electronic paper 63. The page management means 18 sends thus received information to respective electronic paper files 72, 82 and 92 through communication means 17.

The ID number of the electronic paper 63, the cursor display data, and the position information, those received by each communication means 17 of the electronic paper files 72, 82 and 92 (those are audiences' electronic paper files), are given to respective page management means 18 of the electronic paper files 72, 82 and 92.

Each page management means 18 of the electronic paper files 72, 82 and 92 obtains ID numbers of sending-receiving electronic papers (electronic papers 73, 83 and 93) corresponding to the received ID number of the electronic paper 63. The obtained ID numbers of the electronic papers 73, 83 and 93 are sent to the display light emitting control means 23 along with the cursor display data and the position information.

According to the ID numbers of the electronic papers 73, 83 and 93, the display light emitting control means 23 sends the cursor display data and the position information to each display driver 12a of the electronic papers 73, 83 and 93.

The display driver 12a displays the cursor according to the cursor display data.

As described above, the presenter 61 points out a specific position on the electronic paper 63 with the writing device 14 during the presentation, the audiences' electronic papers 73, 83 and 93 displays the cursor on the position pointed by the presenter 61.

Additionally, when the presenter 61 selects an instruction end from the software menu with the writing device 14, the cursor drawing means 26 stops displaying the cursor. When the displaying of the cursor is interrupted by the cursor drawing means 26, the page management means 18 of the electronic paper file 62 of the presenter 61 stops sending the cursor display data. Accordingly, a cursor displayed on respective electronic papers 73, 83 and 93 of the audiences' electronic paper file 72, 82 and 92 disappears therefrom.

Secondary, the display control means 27 is explained hereinafter. There is a case where the audiences 71, 81 and 91 ask questions during the presentation by means of each electronic paper file 72, 82 and 92, for example. In this case, the audience 71 activates the software menu on his electronic paper file 72 and selects "cursor drawing". And then, he displays the cursor on a position that he wants to ask about with the writing device 14, and asks questions to the presenter 61. The cursor displayed by the audience 71 is also displayed on respective electronic papers used by the audiences 81 and 91 and the presenter 61.

However, if plural audiences display a cursor at the same time during the presentation, things got a bit out of control.

And so, each electronic paper file 62, 72, 82 and 92 is provided with the display control means 27 for controlling that the display light emitting control means 23 activates the cursor drawing means 26, and the display control means 27 prestores the main unit ID number of the electronic paper file 62 of the presenter 61, the electronic paper file 62 managing a right of displaying the cursor.

If the audience 71 wants to display the cursor to ask questions during the presentation, he activates the software menu and selects a request to display a cursor from the software menu with the writing device 14.

The selected request is sent to the display light emitting control means 23 of the electronic paper file 72 through transparent sheet 44. On receiving the request, the display light emitting control means 23 sends the request to the display control means 27.

The display control means 27 sends the cursor display request and the main unit ID of the electronic paper file 72 to the electronic paper file 62 of the presenter 61 according to the stored main unit ID of the electronic paper file 62 through communication means 17.

When the electronic paper file 62 receives the request and the main unit ID through communication means 17, the display control means 27 displays the main unit ID of the electronic paper file 72 of the audience 71 on the cover display 271 of the electronic paper file 62.

The presenter 61 realizes the displayed main unit ID, and decides whether an allowance of displaying a cursor is given to the electronic paper file 72. If he gives the allowance to the audience 71, The presenter 61 points out a position displaying the main unit ID with the writing device 14. And then the display control means 27 sends a display allowance signal to the electronic paper file 72 of the audience 71 through communication means 17.

The audience 71 receives the display allowance signal by the display control means 27 of the electronic paper file 72 through communication means 17. Then, the display control means 27 displays a notification to the effect that the displaying is allowed, on the cover display 271 of the electronic paper file 72. At the same time, the display control means 27 of the electronic paper file 72 cancels the limitation to the working of the cursor drawing means 26 of the electronic paper file 72.

After this, the audience 71 selects the menu of "cursor drawing" displayed on his electronic paper 23 of the electronic paper file 72 with the writing device 14, and then the display light emitting control means 23 is permitted to activate the cursor drawing means 26 of the electronic paper file 72.

In the next step, when the audience 71 points out a specific position on his electronic paper (for example, electronic paper 74) with the writing device 14, the position information is sent to the display light emitting control means 23 of the electronic paper file 72. On receiving the position information, the display light emitting control means 23 obtains the cursor display data from the cursor drawing means 26, and displays the cursor on the position pointed by the writing device 14 of the electronic paper 74.

And the display light emitting control means 23 of the electric paper file 72 sends the page management means 18 the position information, the cursor display data, and the ID number of the electronic paper 74. Those information and data are sent to the electronic paper files 62, 82 and 92 by the page management means 18 through communication means 17.

Each page management means 18 of the electronic papers 62, 82 and 92 receives through each communication means 17 the ID number of the electronic paper 74, the cursor display data and the position information, and then obtains ID numbers of sending-receiving electronic paper 64, 84 and 94 corresponding to the electronic paper 74. The page management means 18 of the electronic paper file 72 sends each display light emitting control means 23 of each electronic paper files 62,82 and 92 the obtained ID numbers along with the cursor display data and the position information.

The display light emitting control means 23 displays the cursor on each electronic paper 64, 74 and 84.

Besides, an audience having any questions may speak to the presenter 61 in oral that he wants to display a cursor. In such case, the presenter 61 inputs the main unit ID of the audience's electronic paper file into the display control means 27 by using the software keyboard, and then the display control means 27 sends the display allowance signal to the electronic paper files of the audiences.

Besides, the cursor drawing means 26 and the display control means 27 may be provided to each of the electronic paper.

EMBODIMENT 6

Figure 11:
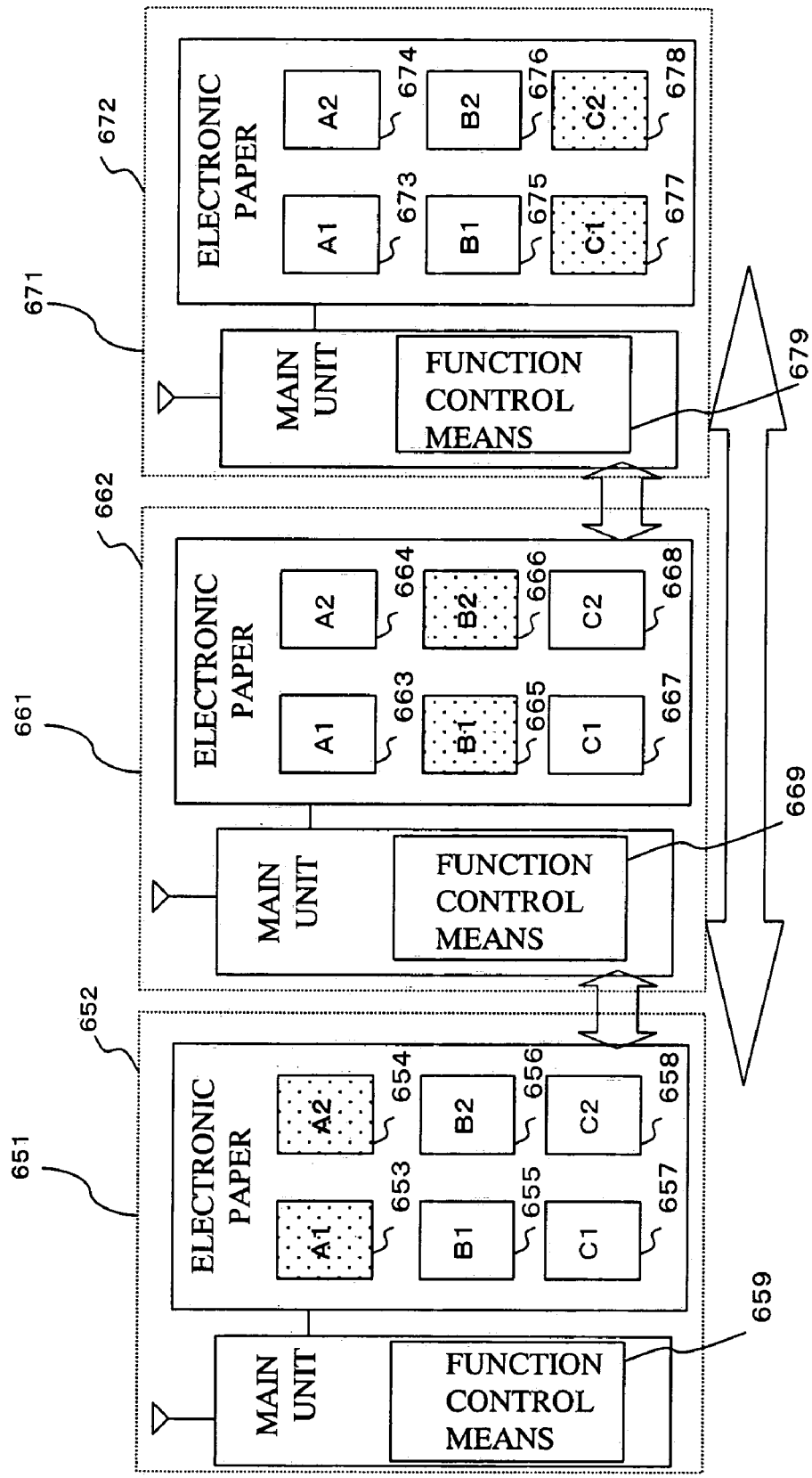
FIG. 11 is a diagram illustrating an image of the working of the electronic paper file of the embodiment 6.

With reference to FIG. 1 and FIG. 11, the interactive conference system using the communication means 17 is taken as an example of this embodiment.

At a conference, there is a case where a specific person does not want the display content displayed on his electronic paper to display them on the other electronic papers. However, even in such case, he wants to display the cursor described in the embodiment 5 on the other electronic papers. Such situation is taken into consideration in this embodiment.

It is arranged so that the main unit is provided with a function control means 28 for controlling functions of respective electronic papers. It is assumed that three users A, B and C hold a conference using the electronic paper file provided with the function control means 28.

The user A 651 (otherwise, the user B 661, or the user C 671) sets the electronic papers 653, 663, and 673 to the sending-receiving electronic papers in the same way as in the embodiment 3, in order to display the contents displayed on the electronic paper 653 on the other electronic papers (electronic papers 663, and 673), as shown in FIG. 11. And likewise, in order to display the display contents of respective electronic papers 654 to 658 on the other electronic papers 664 to 668 and 674 to 678, each electronic paper is set to a sending-receiving electronic paper.

Next, the user A 651 determines functions to be executed by respective electronic papers, as described hereinafter.

The user A inputs from the software keyboard of the electronic paper 653 the ID number of the electronic paper 653 and that the electronic paper 653 is a master electronic paper. The inputted ID number and information are given to the function control means 659 (28) of the electronic paper file 652.

On receiving the notification that the electronic paper 653 is the master, the function control means 659 obtains ID numbers of sending-receiving electronic papers 663 and 673 displaying the contents same as the electronic paper 653 and the main unit IDs of the file bodies 662 and 672 connected with the electronic papers 663 and 673 from the page management means 18.

On obtaining the ID numbers of the electronic papers 663 and 673 and the main unit ID numbers of the electronic paper files 662 and 672, the function control means 659 sends the electronic paper files 663 and 673 a request to accept the electronic paper 653 as the master of the electronic papers 663 and 673 through communication means 17.

The request sent from the function control means 659 is received by respective function control means 669 and 679 through each communication means 17 of the electronic paper files 662 and 672. The function control means 669 and 679 display said received request on the cover display 271 of the electronic paper file 662 and 672.

In case where the electronic paper 653 is acceptable as the master electronic paper, the users B 661 and C 671 point out the position displaying that the electronic paper 653 is accepted as the master with the writing device 14. After the selection of the user B 661 and the user C 671, the function control means 669 and 679 send the function control means 659 of the user A 651 the allowance that the users B and C-accepted the electronic paper 653 as the master.

Figure 12:
FIG. 12 is a diagram showing an example of a display of the cover display.

When the function control means 659 of the user A 651 receives the acceptance from both the function control means 669 and 679, the electronic paper 653 displays on the display 11 a list of functions installed in the electronic papers 663 and 673 as shown in FIG. 12. The functions of the electronic paper 663 and 673 are a function of displaying and operating a cursor, a function of changing the display content, a function of editing characters and images displayed thereon, and a function of sending the updated display content to the other electronic papers, for example.

The user A selects with the writing device 14 a function to be executed by the other electronic papers 663 and 673 from the list of functions. For instance, when the user A selects a specific column from the list with the writing device 14, as shown in FIG. 12, the column displaying changes from "effective" to "ineffective", or from "ineffective" to "effective".

Whenever the user A changes each function of the electronic papers 663 and 673 to effective or ineffective, the function control means 659 sends the change to the other function control means 669 and 679. On receiving the change of the function, the function control means 669 and 679 switches the function of the electronic paper 663 and 673.

For instance, when the cursor display and operation function and/or the editing function of the displayed characters and images of the electronic paper 663 are changed to ineffective, the function control means 669 prevents the display light emitting control means 23 from receiving the position information of the contact point sent from the transparent sheet 44 of the electronic paper 663. And if the changing function of the display content is changed to ineffective, the display control means 669 prevents the display light emitting control means 23 from sending the display bit data to the electronic paper 663. In addition, if the function of sending the updated display content to the other electronic papers is changed to ineffective, the function control means 669 prevents the communication means 17 to communicate with the others.

The function of the other electronic papers 663 and 673 is limited only by the function control communication means 659 of the electronic paper file 652 connected with the master electronic paper.

Among the electronic papers shown in FIG. 11, a block given a dot pattern (emphasized pattern) represents a master electronic paper. That is to say, the electronic papers 653 and 654 are the mater electronic papers of the electronic papers 663 and 664, the electronic papers 673 and 674. And, the electronic papers 665 and 666 are the mater electronic papers of the electronic papers 655 and 656, the electronic papers 675 and 676.

In case where the electronic paper file wherein the function of the electronic paper is limited as described above is used at a conference, if the user A 651 writes his opinion into the electronic papers 653 and 654, his opinion is displayed on the electronic papers 663 and 664 of the user B 661 and the electronic papers 673 and 674 of the user C 761.

Moreover, if the function of sending the other electronic papers the display content displayed on the electronic papers 665 to 658 is limited, notes written into the electronic papers 665 to 658 by the user A 651 are not displayed on the electronic papers of the user B 661 and the user C 761.

And now, the above embodiments refer only to the method of sending and receiving a display content displayed on an electronic paper. But it is needless to say that the communication means 17 may be used for the file sending and receiving method.

EMBODIMENT 7

In the above embodiments, it is arranged that a display content of a specific electronic paper be same as that of the other electronic paper. But in this embodiment, it is arranged that the display contents on a specific group of electronic papers are same as that on the other group of electronic papers. Such configuration is explained hereinafter.

The user turns the electronic paper file 100 on power, and then the page management means 18 displays a menu 154 on the cover display 271 of the main unit 20 of the electronic paper file 100, as shown in FIG. 3.

Besides, it is not always necessary for the page management means 18 to display the menu 154 on the cover display 271. For instance, the page management means 18 may display the menu 154 on a specific electronic paper connected with the electronic paper file 100.

When the menu 154 is displayed, the user selects an "initial setting" 154c of a "system setting" menu 154b among the menu 154 with a pointing device. And hereupon, an ID number obtaining means 152, which is provided to the main unit 20, obtains ID numbers D101 to D106 of the electronic papers 101 to 106 shown in FIG. 13 from the electronic papers 101 to 106, those electronic papers are within a communication area of the communication means 17 (for example, a area within a radius of 5 m). It is presupposed that the electronic papers 101 to 106 are tuned on power so that the ID number obtaining means 152 could obtain the ID numbers D101 to D106.

The ID number obtaining means 152 sends the obtained ID numbers D101 to D106 to a setting means 153 that the page management means 18 is provided with.

Figure 14:
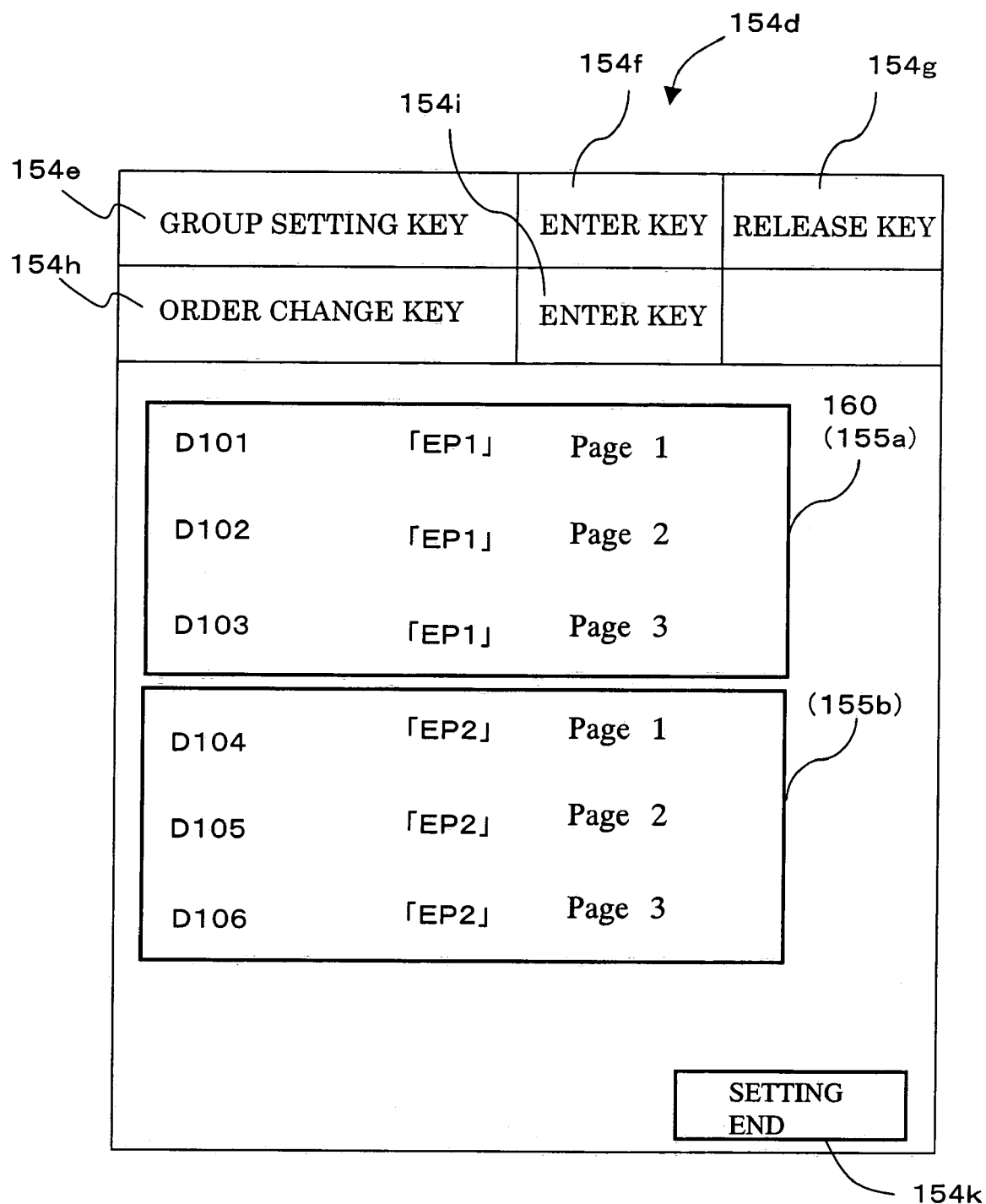
FIG. 14 is a diagram showing a destination setting menu.

In the next step, the setting means 153 displays the received ID numbers D110 to D106 on the cover display 271 together with a destination setting menu 154d, as shown in FIG. 14.

The user presses down a group setting key 154e of the destination setting menu 154d with the pointing device in order to classify the displayed ID numbers D101 to D106. And the user selects the ID numbers D101 to D103 with the pointing device and then presses down an enter key 154f.

Thereby, the setting means 153 stores the ID numbers D101 to D103 as components of a group 155a and also stores page numbers 1 to 3 of the group 155a correlated with the ID numbers D101 to D103. The setting means 153 displays the stored page numbers on the destination setting menu 154d as shown in FIG. 14, and also displays a specific colored frame 160 around the ID numbers D101 to D103 composing the group 155a.

Next, the user selects a region surrounded with the frame 160 shown in FIG. 14 with the pointing device, and inputs a name of the group 155a, for example, "EP1", to the setting means 153 by means of the software keyboard. The setting means 153 stores the inputted "EP1" as the group name of the group 155a, and displays it on the destination setting menu 154*d*. Besides, if the user does not input the group name, the setting means 153 may decide the group name arbitrarily.

Like the setting of the group 155*a*, the user specifies the ID numbers D104 to D106 as a group 155*b*, and inputs an "EP2" as group name to the setting means 153. The setting means 153 stores the ID numbers 104 to 106 as the group 155*b* correlating those numbers with page numbers 1 to 3 of the group.

Besides, the other method may be adopted for classifying electronic papers to groups. For instance, only when the user inputs a number of groups or a number of sheets per one group, the setting means 153 may classify the ID numbers D101 to D106 into groups. Otherwise, if the user does not classify into groups, the setting means 153 may define the ID numbers D101 to D106 as one group.

The setting means 153 stores the ID numbers D101 to D106, the group names, and the page numbers of each groups, and then sends the group names and page numbers of respective electronic papers 101 to 106 to each electronic paper 101 to 106 through communication means 17.

In this embodiment, the group name "EP1" is sent to the electronic papers 101 to 103 corresponding to the ID numbers D101 to D103, and the group name "EP2" is sent to the electronic papers 104 to 106 corresponding to the ID numbers D104 to D106.

Figure 13:
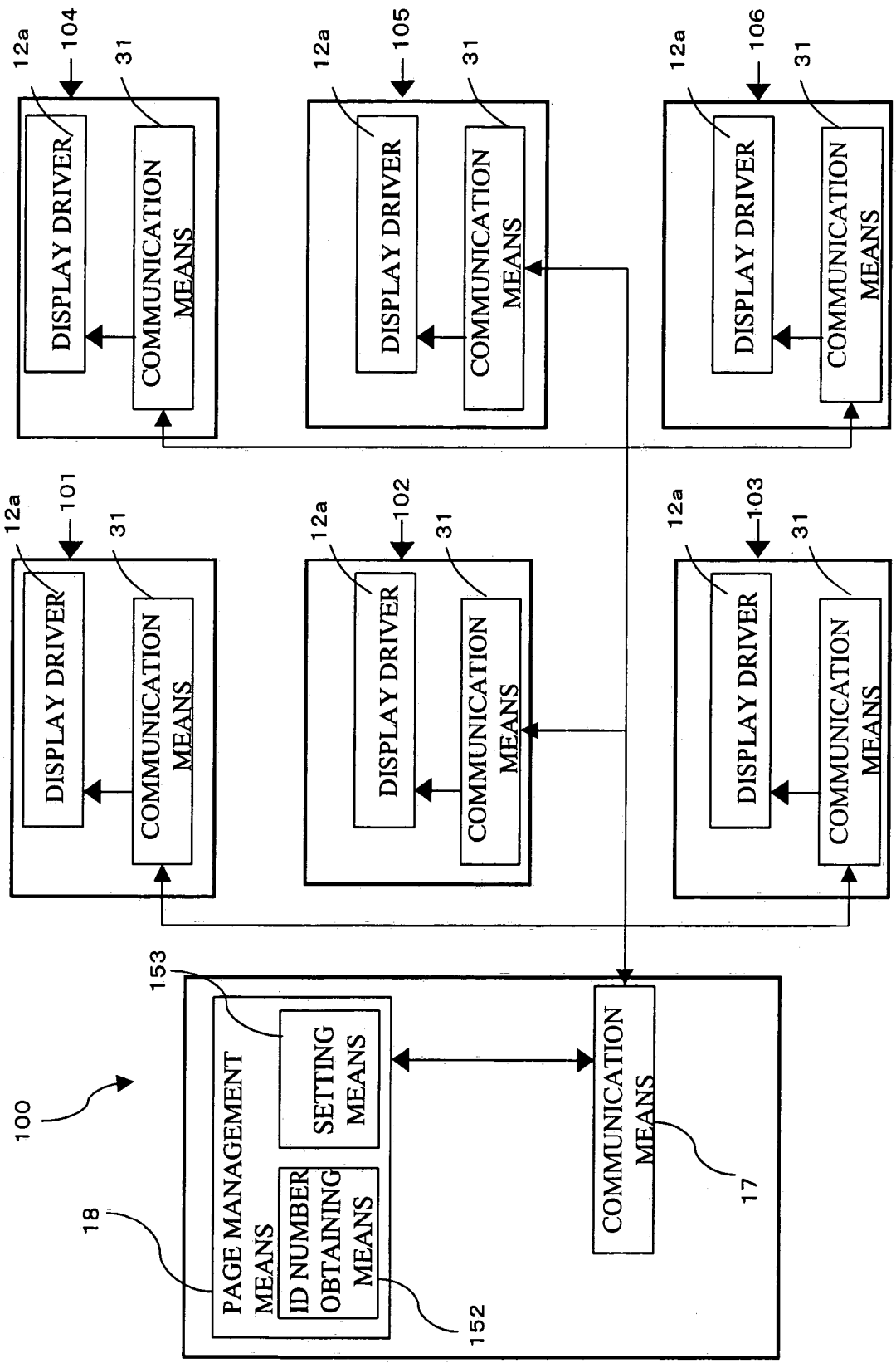
FIG. 13 is a diagram showing a schematic configuration of the electronic paper file of the embodiment 7.

When a communication means 31 of the electronic papers 101 to 103 shown in FIG. 13 receives the group name "EP1", each display driver 12*a* of the electronic papers 101 to 103 displays the "EP1" on a specific position of the display 11. Likewise, each display driver 12*a* of the electronic papers 104 to 106 displays the received group name "EP2" on a specific position of the display 11. In such way, each electronic paper 101 to 106 displays the group name so that the user can easily confirm the groups in which each electronic paper 101 to 106 is included.

Besides, the specific position of the display 11 on which the group name is displayed may be decided in advance, or may be set at setting the group.

Next, the following is concerned with the operation of releasing the groups. For instance, the user presses a release key 514*g* of the destination setting menu 154*d* with the pointing device, and selects the region surrounding with the frame 160. Thereby, the setting means 153 recognizes an input of an instruction to release the group 155*a*.

The setting means 153 extracts the ID numbers D101 to D103 corresponding to the group name "EP1" from its stored data, and deletes the group name "EP1" and the page numbers that were stored being correlated with the ID numbers D101 to D103.

In this way, the group name and the page number can be deleted easily, with the result that the classification into groups can be re-executed even if the user makes a mistake in the classifying operation.

In case where the group 155*a* is released as above, the setting means 153 sends the electronic papers 101 to 103 composing the released group 155*a* an instruction to cancel the displaying of the group name.

When each communication means 31 of electronic papers 101 to 103 receives the above cancel instruction, each display driver 12*a* of the electronic papers 101 to 103 deletes the group name displayed on the display 11.

The page numbers of the group can be changed by a user as follows.

The user presses an order change key 154*h* shown in FIG. 14 with the writing device 14, and selects a specific ID number. And the user inputs a specific page number from the software keyboard, and presses the enter key 154*i*. Thereby, the setting means 153 stores the inputted page number as a page number of an electronic paper of the selected ID number. Besides, if the changed page number has been allocated to the other electronic paper as a page number, the setting means 153 changes the page number of the other electronic paper to an unoccupied page number.

Moreover, the electronic paper may display names that the user gives to the electronic papers 101 to 106.

For instance, the user selects a specific ID number with the writing device 14, and inputs specific characters and symbols from the software keyboard. The inputted characters and symbols are stored in the setting means 153 as a name representing the electronic paper of the ID number. If the user does not input any characters or symbols, the setting means 153 may store the ID number as a name of the electronic paper.

The setting means 153 sends the electronic papers corresponding to the stored names the name of the electronic paper through communication means 17.

When the communication means 17 of the electronic paper receives the name corresponding to the electronic papers, the display driver 12*a* of the electronic paper displays the received name on a specific position of the electronic paper.

Otherwise, the electronic paper may display a mark for identifying the group so that the user can know the group including the electronic paper with ease.

Figure 15:
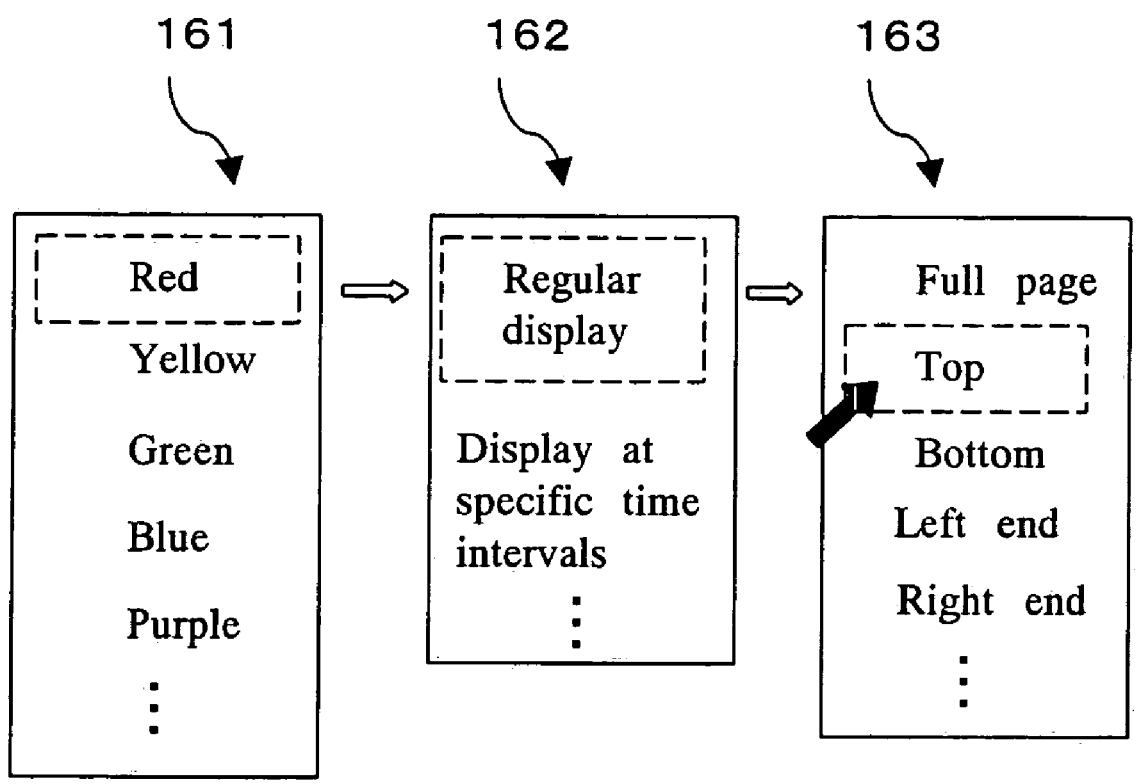
FIG. 15 is a diagram showing a pull-down menu.

In order to carry out the mark displaying, the user selects the frame 160 shown in FIG. 14 with the writing device 14, and then the setting means 153 displays on a specific position of the cover display 271 a pull-down menu 161 shown in FIG. 15 for selecting a color of mark of the group.

The user selects a color of mark, red, from the pull-down menu 161, for example. After the user selects the color, the setting means 153 displays a pull-down menu 162 for selecting a display method of mark, for example, "regular display" or "display at specific time intervals". When the user selects "regular display", the setting means 153 displays a pull-down menu 163 for selecting a position to display a mark, for example, a full page of the display 11, a bottom, top, left end, or right end of the display 11. When the user selects the top position, the setting means 153 creates display information of "red; regular display; top".

The setting means 153 sends the created display information to the electronic papers 101 to 103 included in the group name 155*a* through communication means 17.

The each communication means 31 of electronic papers 101 to 103 receive the display information, and the display driver 12*a* displays a mark based on the display information. That is to say, the top of each electronic paper 101 to 103 emits light in red.

As described above, the mark based on the display information is displayed on the electronic paper so that the user can know the group including the electronic papers.

Besides, when the destination setting menu 154*d* is terminated, the user selects a "setting end" key 154*k* by the pointing device. By selecting the setting end key 154*k*, the setting means 153 interrupts the displaying of the destination setting menu 154*d* and the page management means 18 displays the menu 154 on the cover display 271.

Moreover, in case of adding a new electronic paper to be classified into groups, the user places the additional electronic paper within the communication area of the communication means 17, selects the "system setting" 154*b* of the menu 154 again, and selects the "initial setting" 154*c*. According to such steps, in the same way as mentioned above, the ID number obtaining means 152 obtains the ID numbers of the electronic paper within the communication area of the communication means 17, and the setting means 153 displays the destination setting menu 154d on the cover display 271. The destination setting menu 154d displays the ID number of the added electronic paper, and the user can recognize that the added ID number is a component of the specific group.

After classifying the electronic paper 101 to 106 to groups, the user performs an operation of inputting the data of collected papers to the electronic paper file 100.

Figure 16:
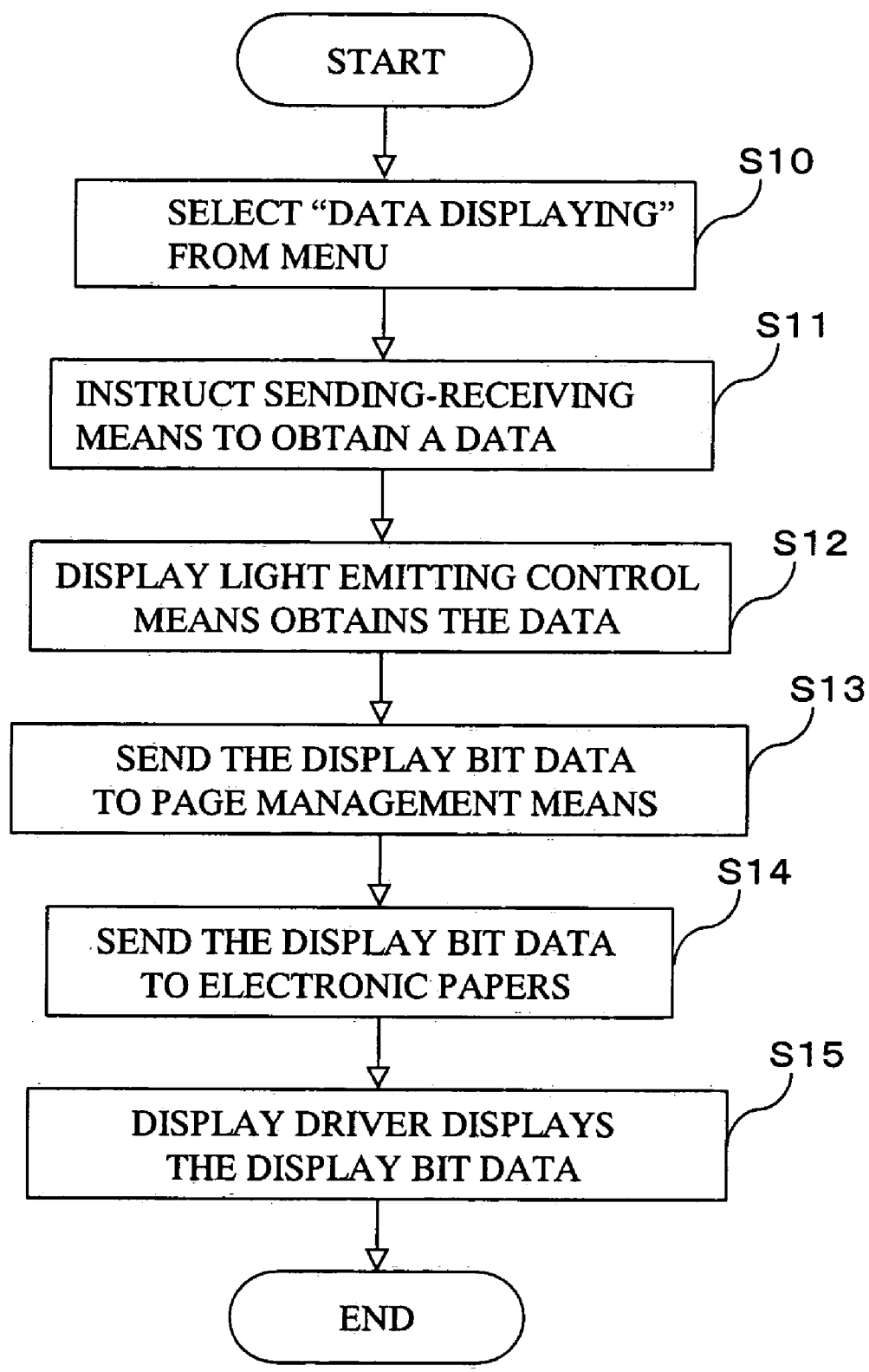
FIG. 16 is a flowchart showing a sending and receiving operation of the electronic paper file of the invention.

First, the user selects a "data displaying" 154m from the menu 154 with the writing device 14 (FIG. 16: S10).

The user inputs "100" by means of the page specifying means 170, for example. After the value is inputted, the page specifying means 170 informs the page management means 18 of the inputted "100".

According to "100" inputted from the page management means 18, the page management means 18 obtains the group name and page numbers of the ID numbers D101 to D106 that are stored in the setting means 153.

In this case, the setting means 153 stores the ID numbers D101 to D106. The ID numbers D101 to D103 belongs to the "EP1" group, and the ID numbers D101 to D103 have page numbers 1 to 3. And the ID numbers D104 to D106 belongs to the "EP2" group, and the ID numbers D104 to D106 have page numbers 1 to 3.

Since the respective "EP1" and "EP2" groups include 3 electronic papers, the page management means 18 informs the display light emitting control means 23 that the respective electronic paper groups comprise three electronic papers and that "100" is inputted to the page management means 170.

On receiving the information that the respective electronic paper groups comprise three electronic papers, the display light emitting control means 23 instructs the signal sending-receiving means 22 to obtain data of pages 100 to 102 of the collected papers from a memory card 41 (FIG. 16, S11). According to the instruction, the signal sending-receiving means 22 obtains the data of pages 100 to 102 from the memory card 41 and sends the data to the display light emitting control means 23 (FIG. 16, S12).

The display light emitting control means 23 converts the received data of pages 100 to 102 to a display bit data as mentioned above. The display light emitting control means 23 sends the converted display bit data to the page management means 18 (FIG. 16, S13).

According to the page numbers of the ID numbers D101 to D106 obtained from the setting means 153, the page management means 18 sends the display bit data to the respective electronic papers 101 to 106. For instance, the display bit data corresponding to page 100 of the collected papers is sent to the respective electronic papers 101 and 104 of the ID numbers D101 and D104 of which page number is 1. Likewise, the display bit data corresponding to page 101 is sent to the electronic papers 102 and 105 of which page number is 2, and the display bit data corresponding to page 102 is sent to the electronic papers 103 and 106 of which page number is 3 (FIG. 16, S14).

When each communication means 31 of the electronic papers 101 to 106 receive the display bit data, the display driver 12a displays the display bit data received by the communication means 31 on the display 11 of the electronic paper (FIG. 16, S15).

In result, the group 155a and the group 155b display pages 100 to 102 of the collected papers.

Moreover, while the electronic papers 101 to 103 and the electronic papers 104 to 106 are displaying pages 100 to 102 of the collected papers, the user inputs "103" by means of the page specifying means 170. According to this operation, the electronic papers 101 to 103 and the electronic papers 104 to 106 display pages 103 to 105 of the collected papers instead. That is to say, even if the contents displayed on the electronic papers are changed, the other electronic papers of the same group display the same display contents as the changed content.

Further more, since the electronic papers 101 to 106 can be detached from the electronic paper files and placed on a desk separately, the user can see a plurality of electronic papers at a time.

In addition, if a specific electronic paper among those electronic papers 101 to 106 is provided with the same function as the main unit 20, only these electronic papers 101 to 106 can consist the same configuration as the above.

EMBODIMENT 8

This embodiment 8 exemplifies a configuration of an electronic paper file capable of making a plurality of electronic papers display a same content.

Figure 17:
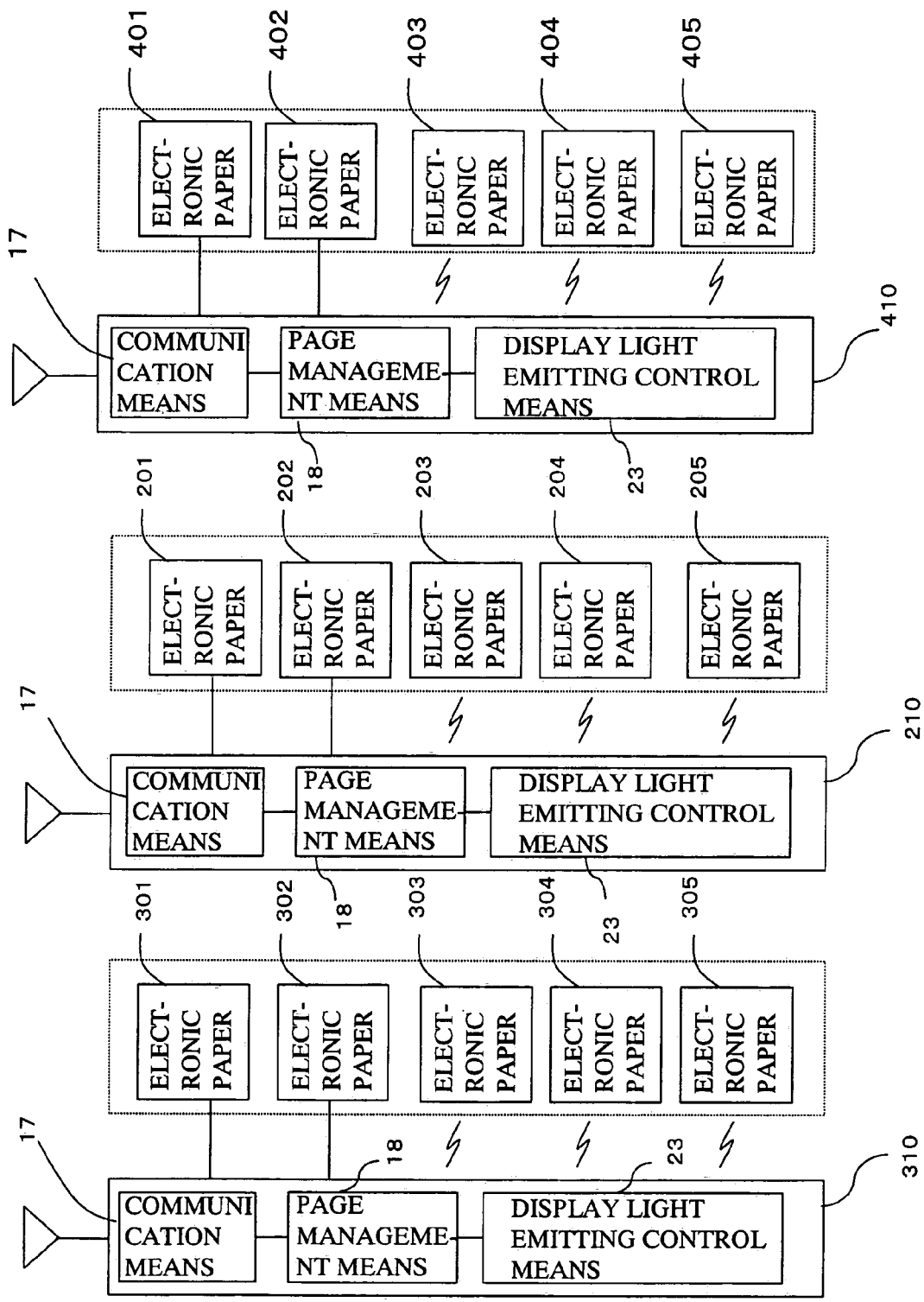
FIG. 17 is a diagram showing a schematic configuration of the electronic paper file of the embodiment 8.

The user selects as a "host" a main unit out of three main units 210, 310, and 410 as shown in FIG. 17, and in each main unit the character storage means 42 and the image storage means 43 store a same data, for example, a same content of the collected papers.

Figure 18:
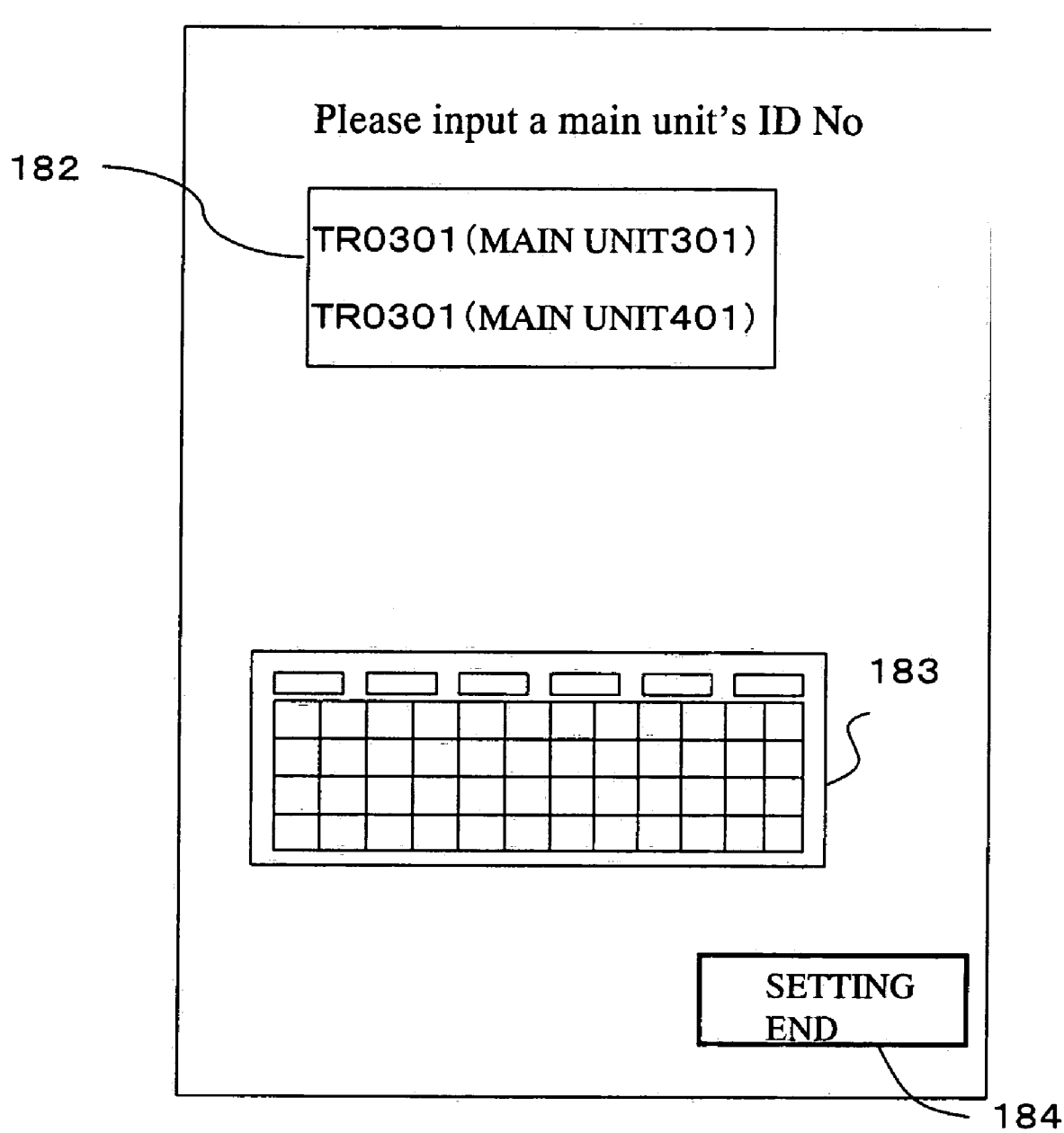
FIG. 18 is a diagram showing an example of a display of the cover display.

That is to say, a host selecting menu 180 displayed on the cover display 271 of the main unit 210 is selected by the writing device 14, as shown in FIG. 3. Then, a role deciding means 181 displays on the cover display 271 an input space 182 for inputting an ID number of a main unit to be a client of the main unit 210, as shown in FIG. 18.

Next, the user inputs the ID numbers of the main units 310 and 410 to be the client to the input space 182 with the software keyboard. After inputting the ID numbers, he presses down the setting end key 184 by means of the software keyboard. In result, the cover display 271 changes the display to the menu 154.

In addition, the role deciding means 181 stores in the page management means 18 the main unit ID numbers of main units 310 and 410 and that the main unit 210 is the host of the other main units 310 and 410. The page management means 18 also informs the display light emitting control means 23 that the main unit 210 is the host of the other main units 310 and 410.

Moreover, the role deciding means 181 sends the main units 310 and 410 the ID number of the main unit 210 and that the main units 310 and 410 are the clients of the main unit 210, through communication means 17.

The information sent from the main unit 210 is received by the respective role deciding means 181 of the main units 310 and 410 through communication means 17. The respective role deciding means 181 of the main units 310 and 410 store the received information in the respective page management means 18 of the main units 310 and 410.

In the next step, the user connects the electronic papers 201 to 205 and the main unit 210, the electronic papers 301 to 305 and the main unit 310, and the electronic papers 401 to 405 and the main unit 410, respectively, so as to communicate each other. The communication may be performed by means of connecting terminals 13 and 25, or may be performed through the communication means 17 and 31 by the infrared data communication.

The user subsequently selects the "data displaying" 154m from the menu 154 displayed on the cover display 271. And then, he inputs "200", for example, by means of the page specifying means 170 of the main unit 210. Hereupon, the page specifying means 170 informs the page management means 18 that "200" is inputted.

On receiving the information, the page management means 18 informs the display light emitting control means 23 of the number of the electronic papers (5 sheets) connected with the main unit 210 and "200" inputted to the page specifying means 170.

On receiving such information, the display light emitting control means 23 instructs the signal sending-receiving means 22 to obtain the data for pages 200 to 204 of the collected papers.

Besides, the user in this embodiment does not insert the memory card storing the data for pages 200 to 204 of the collected papers into the main unit 210 like the embodiment 1. Therefore, the signal sending-receiving means 22 informs the display light emitting control means 23 that there is no memory card 41 therein. On receiving the information, the display light emitting control means 23, referring to the character storage means 42 and the image storage means 43, decides whether the data for pages 200 to 204 of the collected papers is stored in the character storage means 42 and the image storage means 43.

Besides as mentioned above, since the character storage means 42 and the image storage means 43 stores the data for pages 200 to 204 of the collected papers, the display light emitting control means 23 can obtain the data for pages 200 to 204 of the collected papers from the character storage means 42 and the image storage means 43.

The display light emitting control means 23 creates a display bit data from the obtained data for pages 201 to 204 in a way mentioned above. Of the created display bit data, the display light emitting control means 23 sends the display bit data of the page 200 to the electronic paper 201, the display bit data of the page 201 to the electronic paper 202, . . . and the display bit data of the page 204 to the electronic paper 205, respectively. The respective display bit data sent from the display light emitting control means 23 are received by each display driver 12a of the electronic papers 201 to 205 through communication means 31 or connecting terminal 13. The display driver 12a displays on the display 11 the received display bit data (the contents of the collected papers).

The display light emitting control means 23 transfers the display bit data of the pages 200 to 204 of the collected papers to the page management means 18 because it has been informed from the page management means 18 that the main unit 210 is the host of the main units 310 and 410.

The page management means 18 sends an instruction to display pages 200 to 204 of the collected papers to the main units 310 and 410 to be the client through communication means 17.

The display instruction sent from the page management means 18 of the main unit 210 is received by each page management means 18 of the main units 310 and 410 through communication means 17 of the main units 310 and 410. The page management means 18 sends the received instruction to the display light emitting control means 23.

On receiving the instruction of displaying the pages 200 to 204 of the collected papers, the display light emitting control means 23 obtains the data of the 200 to 204 pages of the collected papers from the character storage means 42 and the image storage means 43. Then the display light emitting control means 23 creates the display bit data from the 200 to 204 pages data of the collected paper thus obtained. The display light emitting control means 23 sends the created display bit data to the electronic papers 301 to 305 and the electronic papers 401 to 405, those electronic papers connected with the main units 310 and 410 respectively.

The display driver 12a of each electronic paper displays the received display bit data (the contents of the collected papers) on respective electronic papers 301 to 305 and 401 to 405.

In result, the electronic papers connected with the main unit 210 displays the same contents as that of the respective electronic papers connected with main unit 310 and 410.

Besides, If the 200 to 204 pages data of the collected papers are not stored in the character storage means 42 and the image storage means 43 of the main units 310 and 410, the page management means 18 of the main unit 210 sends the 200 to 204 pages data of the collected papers to the main units 310 and 410 together with the instruction of displaying said pages.

EMBODIMENT 9

The electronic paper file described in the above embodiments is configured as shown in FIG. 24, in which the connecting terminal 25 of the main unit is fixed to the spine 24. However, the electronic paper file becomes available for more use if the connecting terminal 25 is rotatable as follows.

Figure 19:
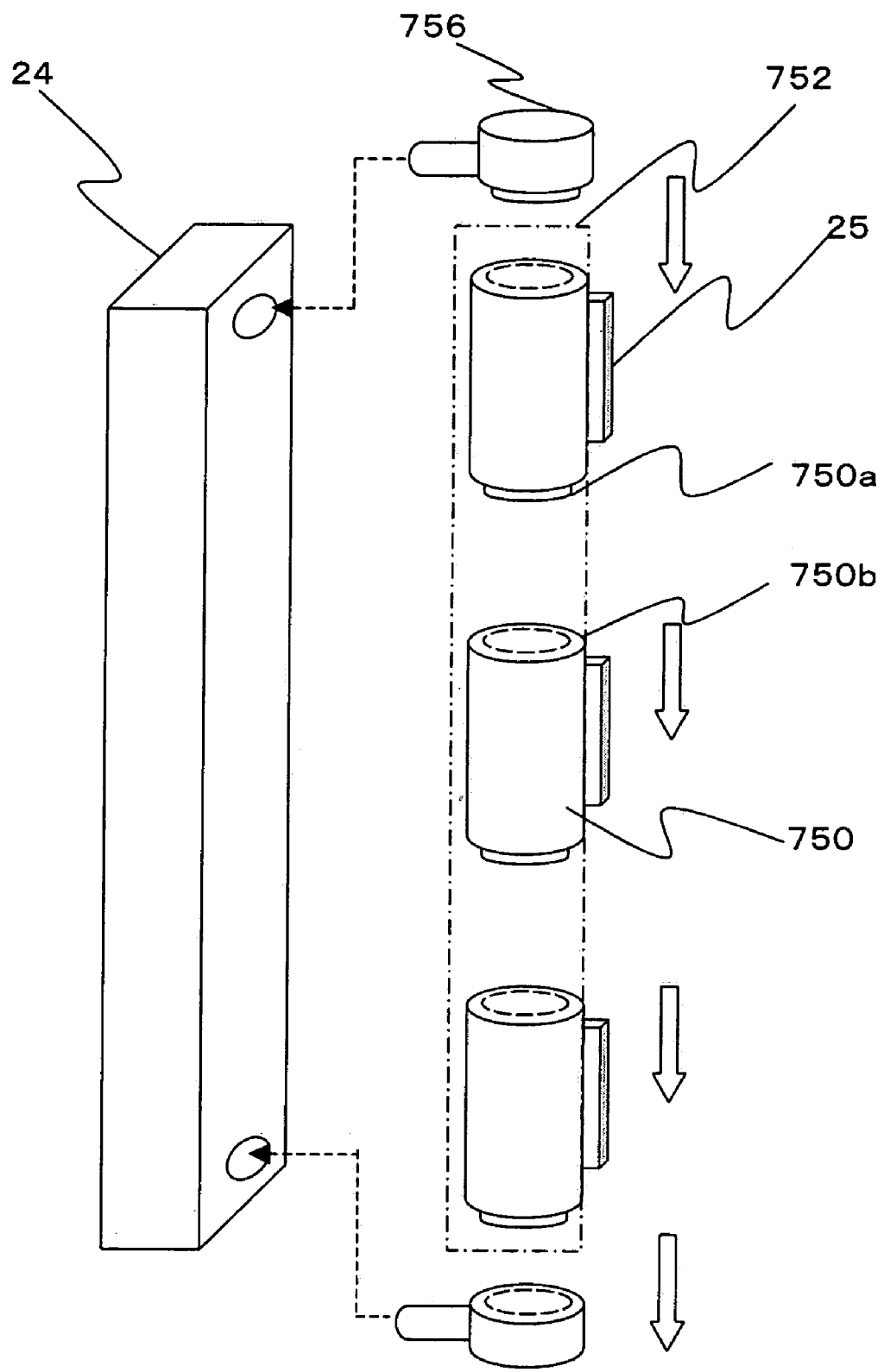
FIG. 19 is an external view of a main unit under a rotatable configuration.

As a configuration shown in FIG. 19, a specific length of a rotatable axis part 750 in a cylindrical form is provided at upper and bottom ends thereof with coupling joints 750a and 750b so as to connect rotatably with the coupling joints 750a and 750b. And the rotatable axis part 750 is provided, in an axis direction of the periphery thereof, with a connecting terminal 25 of the main unit. A jointed axis 752 is formed by coupling such configured rotatable axis parts mutually. The upper and bottom ends of the jointed axis 752 are jointed to an axis end parts 756 rotatably. The axis end parts 753 are fixed to the spine 24.

Figure 20:
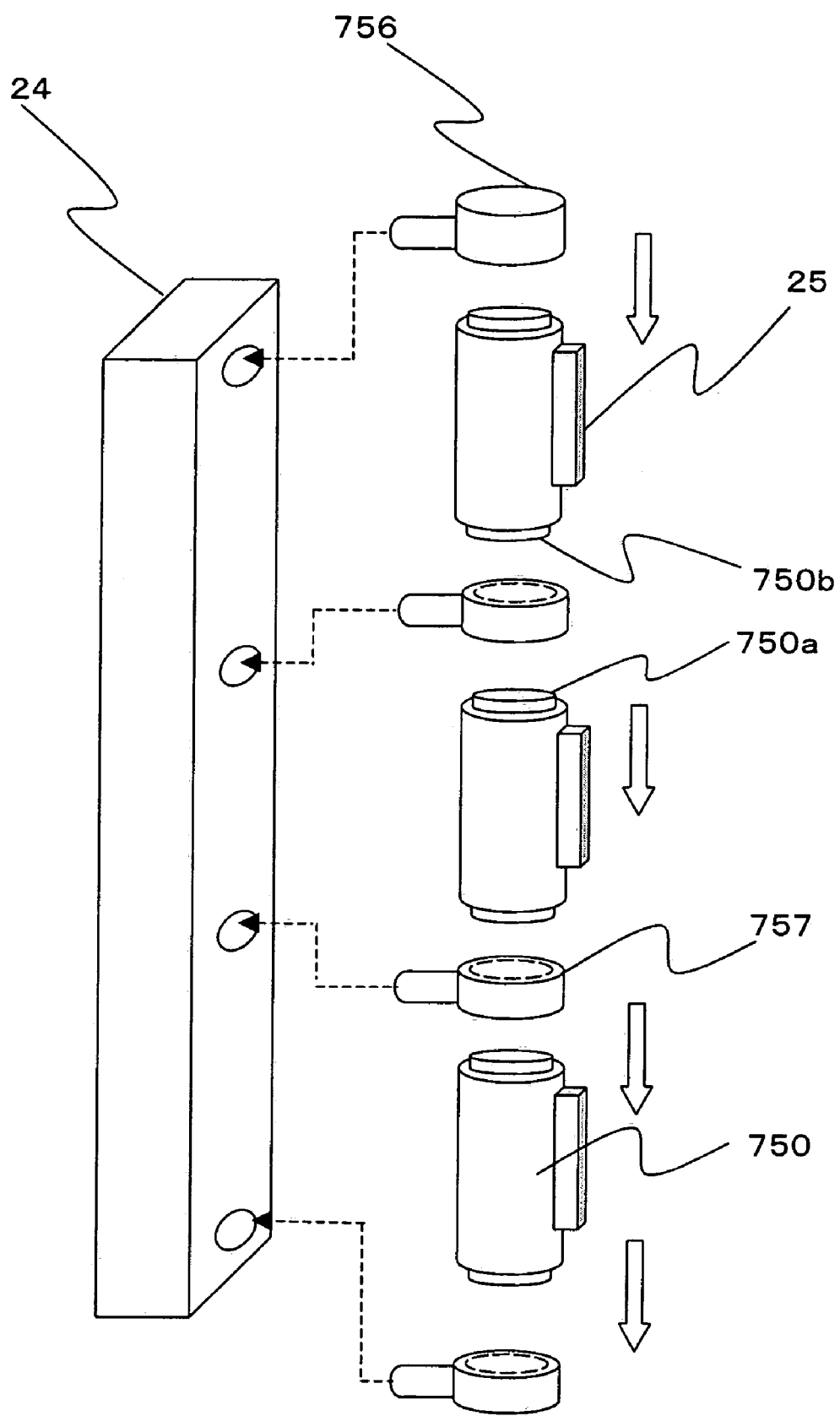
FIG. 20 is a diagram showing a case of using intermediate fixed parts.

The above description relates to the configuration that each rotatable axis part 750 is coupled mutually in direct. But when an intermediate fixed part 757 is mounted between rotatable axis parts 750 as shown in FIG. 20, it is possible to attach the jointed axis 752 to the spine 24 more steadily.

In other words, the coupling joint 750a and 750b of each rotatable axis part 750 are inserted to the intermediate fixed parts 757 rotatably, and then it forms a jointed axis 752 consisting of these rotatable axis parts. And the jointed axis 752 is fixed to the spine 24 by the intermediate fixed parts 757 as well as by the axis end parts 752 like the above.

Figure 21A:
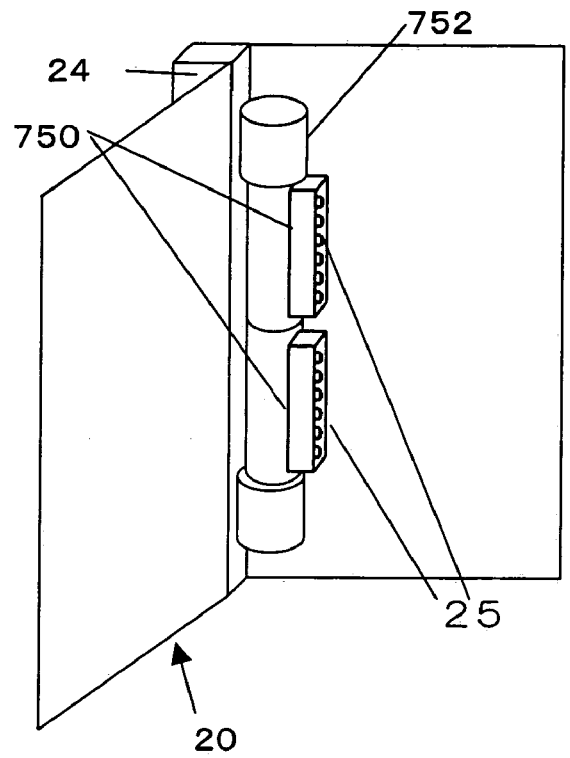
FIG. 21A and FIG. 21B are drawings showing a state that connecting terminals of the main unit are fixed to different positions in the longitudinal direction.
Figure 21B:
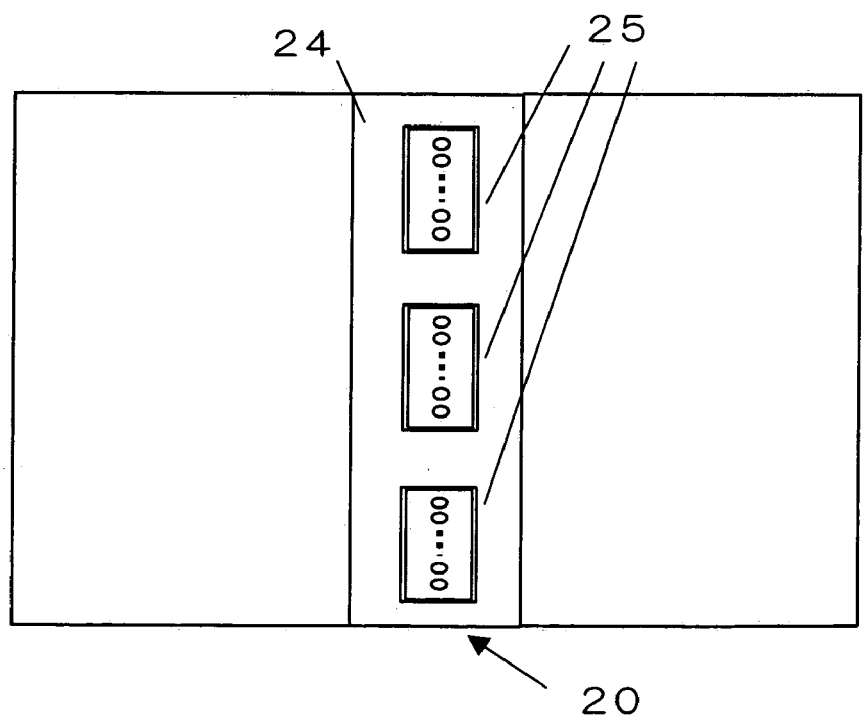

The connecting terminal 13 of the electronic paper in FIG. 24 is placed on a specific position of the electronic paper so that the electronic paper 701 can be connected only with the connecting terminal 25 of the main unit corresponding to the position of the connecting terminal 13. Accordingly, in case as shown in FIG. 21A and 21B where a plurality of connecting terminals 25 are placed on different positions in the longitudinal direction of the main unit 20, the user has to prepare an electronic paper which is provided with a connecting terminal 13 on a position connectable to either of connecting terminals of the main unit. It is very defective. In order to settle such defective, the following configuration may be adopted.

Figure 22:
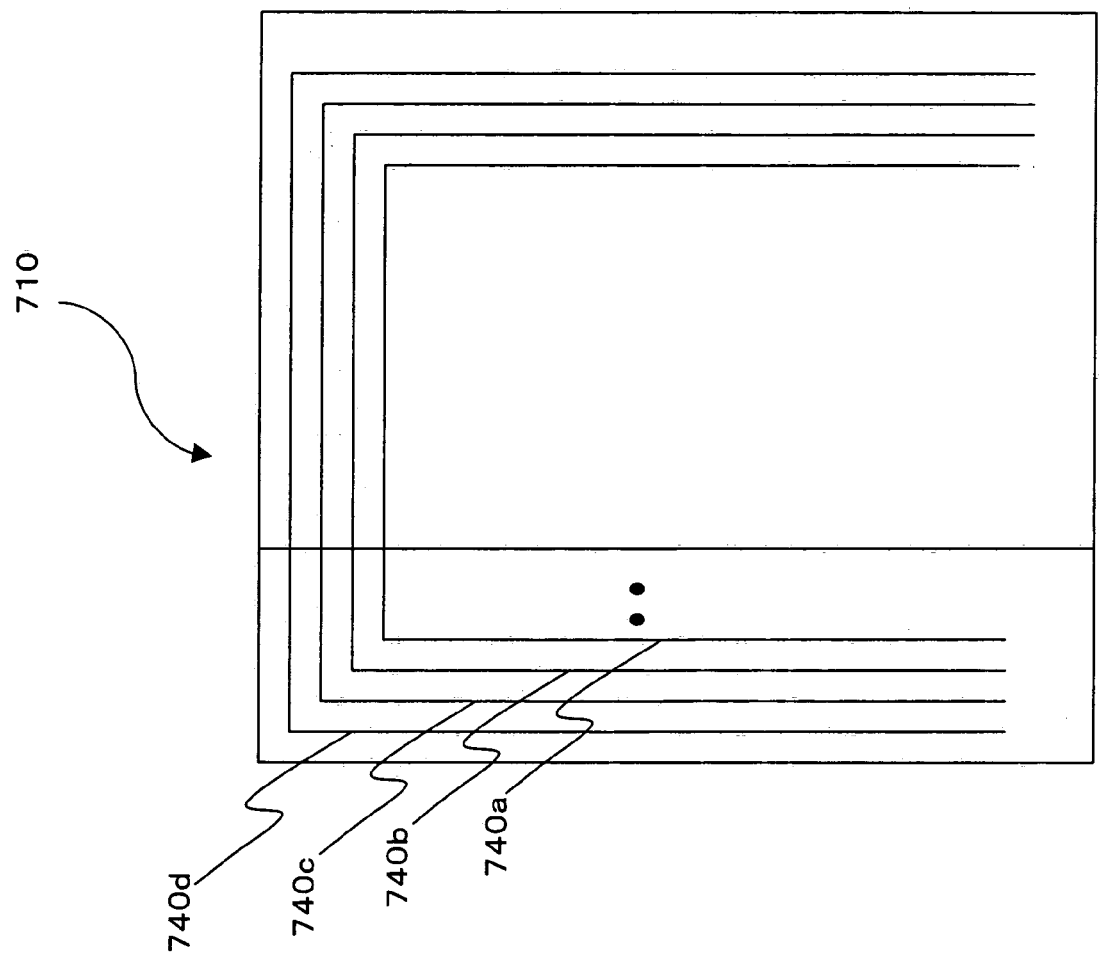
FIG. 22 is a diagram showing a shape of connecting terminal of the electronic paper side.

That is to say, as shown in FIG. 22, a necessary number of leads 740 to transfer data are provided to an end of the electronic paper 701 in the longitudinal directions in parallel.

Figure 23:
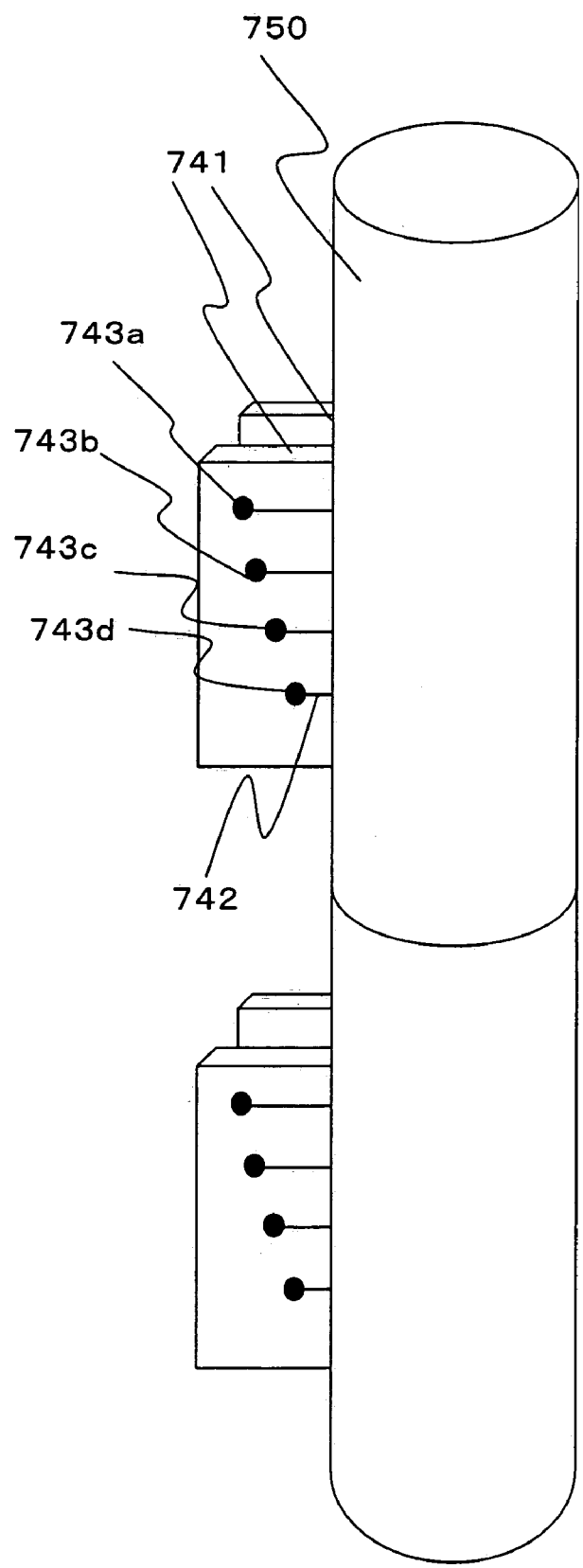
FIG. 23 is a diagram showing a shape of connecting terminal of the main unit side.

On the other hand, as shown in FIG. 23, two holding plates 741 holding elastically the electronic paper 701 in the thickness direction project in the radius direction from the rotatable axis part 750. The holding plate 741 is provided to the inner face thereof with a conducting lead 742 of which point contacts to each parallel lead 740 on the electronic paper 701, and it is arranged so as to conduct the conducting lead 742 to the conducting lead 742 of the main unit.

The number of the conducting leads 742 composing each connecting terminal 25 is same as the number of parallel leads 740 of the electronic paper, and is provided with a contacting point 743 electrically contactable to the parallel lead 740 at the top. And the connecting terminal 713 of the electronic paper is held from the both sides by the holding plate 741 of the connecting terminal 25 of the main unit, so that the respective parallel leads 740a, b, c and d can contact to the respective contacting points 743a, b, c and d. Therefore, it is needless to say that the data transferred by the display light emitting control means 23 flows to a specific connecting terminal 13 through contacting points 743a, b and c.

The invention claimed is:

1. An electronic paper file comprising an electronic paper with a display function and a main unit attachable with a plurality of said electronic papers, comprising:
    communication means for sending and receiving data to and from a different electronic paper file; and
    page management means for specifying one of the electronic papers to display the data received by the communication means and giving the received data to the specified electronic paper;
    cursor drawing means for displaying a cursor indicating a specific region on the specified electronic paper, and sending cursor display data for displaying the cursor to the different electronic paper file through the communication means; and
    display control means for restricting the cursor drawing means from drawing the cursor and sending the cursor display data to the different electronic paper file,
    wherein, when two electronic paper files perform the communication, the electronic paper file, when it is on a slave side, sends a request to display the cursor to a master side electronic paper file through the communication means, and the display control means cancels the restriction on the cursor drawing means upon receipt of a display allowance signal from the master side electronic paper file in response to the request.

2. The electronic paper file according to claim 1, wherein the page management means is further provided with a function of specifying one of the electronic papers to input data thereto and giving the inputted data on the specified electronic paper to the communication means, and specifies different electronic papers as an electronic paper to display the received data and an electronic paper to input the data thereto, respectively.

3. The electronic paper file according to claim 2, wherein the page management means specifies two electronic papers covering two facing pages as an electronic paper to display the received data and another electronic paper to display the data to be sent.

4. The electronic paper file according to claim 1, wherein the page management means is further provided with a function of specifying one of the electronic papers to input data thereto and giving the inputted data on the specified electronic paper to the communication means, and specifies a same electronic paper as an electronic paper to display the received data and an electronic paper to input the data thereto.

5. The electronic paper file according to claim 4, wherein the page management means specifies two electronic papers covering two facing pages as an electronic paper to display both the received data and the data to be sent and an electronic paper provided with an input function respectively.

6. The electronic paper file according to either claim 3 or 5, wherein an electronic paper is attachable to the electronic paper file removably.

7. The electronic paper file according to claim 1, wherein the page management means is provided with a function control means for controlling functions of the respective electronic papers according to an instruction sent from a different electronic paper.

8. An electronic paper file comprising an electronic paper with a display function and a main unit attachable with a plurality of said electronic papers, comprising:
    setting means for setting a group consisting of one or more electronic papers and giving the group a group name, according to ID numbers for identifying the electronic papers;
    page management means for deciding data to be displayed on the electronic papers according to the ID numbers; and
    communication means for giving the data decided by the page management means to, and giving the group name as data to be displayed on each electronic paper to, the electronic papers included in the group.

9. The electronic paper file according to claim 8, wherein the page management means decides data to be displayed by the electronic paper according to a page number given by a user.

10. The electronic paper file according to claim 8, which further comprising ID number obtaining means for obtaining the ID number from the electronic paper.

11. The electronic paper file according to claim 8, wherein the setting means sets display information in order to display on the electronic paper a mark specifying the group, and the communication means sends the display information to the electronic paper.

12. The electronic paper file according to claim 11, wherein the display information indicates a color, size and displaying method of the mark of the group.

13. The electronic paper file according to claim 8, wherein the electronic paper is attached to the main unit removably by providing the electronic paper with one of a pair of connecting terminals including both the electrical and physical connecting functions, as well as providing the main unit with the other connecting terminal.

14. The electronic paper file according to claim 13, wherein a position of the other connecting terminal arranged on the main unit is fixed.

15. The electronic paper file according to claim 13, comprising a jointed axis formed by arranging in an axis direction a plurality of rotatable axis parts provided with the other connecting terminal so as to rotate the rotatable axis part freely.

16. An electronic paper file comprising an electronic paper with a display function and a main unit attachable with a plurality of said electronic papers, comprising:
    page management means for deciding a data to be displayed on an electronic paper according to an ID number for identifying the electronic paper; and communication means for giving the data decided by the page management means to the electronic paper, wherein the electronic paper is removably attached to the main unit with one of a pair of connecting terminals having both the electrical and physical connecting functions, and the main unit has a jointed axis jointing a plurality of rotatable axis parts having the connecting terminal for a connecting terminal of an electronic paper, and being arranged in an axis direction so as to be rotatable freely.

17. An electronic paper file comprising an electronic paper with a display function and a main unit attachable with a plurality of said electronic papers, comprising:

communication means for sending and receiving data to and from a different electronic paper file;

page management means for specifying one of the electronic papers to display the data received by the communication means and giving the received data to the specified electronic paper;

cursor drawing means for displaying a cursor indicating a specific region on the electronic paper, and sending a cursor display data for displaying the cursor to the different electronic paper file through the communication means; and display control means for restricting the cursor drawing means from drawing the cursor and sending the cursor display data to the different electronic paper file, wherein, when two electronic paper files performs the communication, the electronic paper file, when it is on a master side, receives a request to display the cursor from a slave side electronic paper file through the communication means, and the display control means determines whether or not to return a display allowance signal for canceling the restriction on the cursor drawing means of the slave side electronic paper file.

18. An electronic paper file comprising an electronic paper with a display function and a main unit attachable with a plurality of said electronic papers, comprising:

communication means for sending and receiving data to and from a different electronic paper file;

page management means for specifying one of the electronic papers to display the data received by the communication means and giving the received data to the specified electronic paper;

cursor drawing means for displaying a cursor indicating a specific region on the electronic paper, and sending a cursor display data for displaying the cursor to the different electronic paper file through the communication means; and display control means for restricting the cursor drawing means from drawing the cursor and sending the cursor display data to the different electronic paper file, wherein, when two electronic paper files performs the communication, in case where the electronic paper file is on a master side, upon receipt of a request to display the cursor from a slave side electronic paper file through the communication means, the display control means determines whether or not to return a display allowance signal, and in case where the electronic paper file is on the slave side, the display control means cancels the restriction on the cursor drawing means upon receipt of the display allowance signal.

* * * * *

UNITED STATES PATENT AND TRADEMARK OFFICE
CERTIFICATE OF CORRECTION

PATENT NO. : 7,249,324 B2  Page 1 of 1
APPLICATION NO. : 10/451735
DATED : July 24, 2007
INVENTOR(S) : Tetsuroh Nakamura et al.

It is certified that error appears in the above-identified patent and that said Letters Patent is hereby corrected as shown below:

On Title Page

Item "(56) References cited, FOREIGN PATENT DOCUMENTS", change "JP 2000-250501 8/2000" to -- JP 2000-250501 9/2000 --

Signed and Sealed this

Eleventh Day of March, 2008

JON W. DUDAS
*Director of the United States Patent and Trademark Office*